(12) United States Patent
Lee et al.

(10) Patent No.: US 10,681,194 B2
(45) Date of Patent: Jun. 9, 2020

(54) MOBILE TERMINAL

(71) Applicant: LG ELECTRONICS INC., Seoul (KR)

(72) Inventors: Haklim Lee, Seoul (KR); Jaehyuk Seol, Seoul (KR); Hanseok Chae, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 15/580,774

(22) PCT Filed: May 11, 2016

(86) PCT No.: PCT/KR2016/004910
§ 371 (c)(1),
(2) Date: Dec. 8, 2017

(87) PCT Pub. No.: WO2016/200062
PCT Pub. Date: Dec. 15, 2016

(65) Prior Publication Data
US 2018/0234530 A1    Aug. 16, 2018

(30) Foreign Application Priority Data

Jun. 8, 2015 (KR) .................. 10-2015-0080442
Nov. 5, 2015 (KR) .................. 10-2015-0155129

(51) Int. Cl.
*H04M 1/02* (2006.01)

(52) U.S. Cl.
CPC ........ *H04M 1/0268* (2013.01); *H04M 1/0214* (2013.01)

(58) Field of Classification Search
CPC .. H04M 1/0268; H04M 1/0214; H04M 1/022; G06F 1/1626; G06F 1/1652; G06F 1/1681; G06F 1/1601; G06F 1/1641; G06F 1/1679; H05K 1/028; H05K 5/0017; H05K 5/0226
See application file for complete search history.

(56) References Cited

U.S. PATENT DOCUMENTS

| | | | |
|---|---|---|---|
| 2014/0111954 A1* | 4/2014 | Lee ................. | G06F 1/1641 361/749 |
| 2014/0226275 A1* | 8/2014 | Ko .................. | G06F 1/1626 361/679.27 |
| 2015/0089974 A1* | 4/2015 | Seo ................. | A44C 5/0076 63/1.13 |

FOREIGN PATENT DOCUMENTS

| KR | 10-2013-0006757 A | 1/2013 |
|---|---|---|
| KR | 10-2014-0049911 A | 4/2014 |
| KR | 10-2014-0101295 A | 8/2014 |
| KR | 10-1452871 B1 | 10/2014 |
| KR | 10-2015-0024172 A | 3/2015 |

\* cited by examiner

*Primary Examiner* — Jianxun Yang
(74) *Attorney, Agent, or Firm* — Birch, Stewart, Kolasch & Birch, LLP

(57) ABSTRACT

A mobile terminal including a foldable case having a front case and rear case and configured to be in one of an opened flat state in which a protrusion of the rear case is slid inward into a sliding area of the front case, a folded state in which the protrusion of the rear case is slid outward from the sliding area, and an intermediate state between the opened flat state and the folded state; a flexible display on a surface of the foldable case; and electrical components between the front case and the rear case.

19 Claims, 44 Drawing Sheets

$L1 = \pi R1$
$L2 = \pi R2$ $L2-L1 > 0$

151

151

151

(a)

(b)

(a)

(b)

(a)

(b)

MOBILE TERMINAL

CROSS REFERENCE TO THE RELATED APPLICATIONS

This application is the National Phase of PCT International Application No. PCT/KR2016/004910, filed on May 11, 2016, which claims priority under 35 U.S.C. § 119(a) to Patent Application Nos. 10-2015-0155129, filed in Republic of Korea on Nov. 5, 2015, and 10-2015-0080442, filed in Republic of Korea on Jun. 8, 2015, all of which are hereby expressly incorporated by reference into the present application.

BACKGROUND OF THE INVENTION

Field of the Invention

The present invention relates to a mobile terminal, and more particularly, to a mobile terminal that allows a state of a mobile terminal body to be desired by placing a spring between a body and a front cover.

Discussion of the Related Art

A terminal can be divided into a mobile terminal (mobile/portable terminal) and a stationary terminal according to whether the terminal can be moved. The mobile terminal can be divided into a handheld terminal and a vehicle mounted terminal according to whether the user can carry the mobile phone directly.

The functions of mobile terminals are diversified. For example, there are data and voice communication, photographing and video shooting through a camera, voice recording, music file playback through a speaker system, and outputting an image or video to a display unit. Some terminals are equipped with electronic game play function or multimedia player function. In particular, modern mobile terminals can receive multicast signals that provide visual content such as broadcast and video or television programs.

As the function of the terminal is diversified, for example, a multimedia player (multimedia player) having a complex function such as photographing or moving picture shooting, playing music or moving picture file).

In order to support and enhance the functionality of such terminals, it may be considered to improve the structural and/or software parts of the terminal.

SUMMARY OF THE INVENTION

The present invention is directed to solving the above-mentioned problems and other problems. Another object of the present invention is to provide a mobile terminal whose state smoothly changes in terms of shape.

According to an aspect of the present invention, there is provided a mobile terminal comprising: a case being in one of among a first state, a second state, and an intermediate state, the first state in which the case is flat, the second state in which the case is folded, the intermediate state in which a state of the case is between the first state and the second state; and a flexible display on a surface of the case, wherein the case includes a front case to which the flexible is coupled; and a rear case being coupled to the front case, and wherein a part of the rear case slides on the front case in accordance with a change in the state of the case.

According to another aspect of the present invention, the front case may include a sliding area formed at an end portion of the front case in the longitudinal direction, wherein the part of the rear case is a protrusion positioned at an end portion of the rear case in a longitudinal direction, and wherein the protrusion is inserted into the sliding area.

According to another aspect of the present invention, the protrusion may be inserted into the sliding area as much as a first depth, the protrusion may be inserted into the sliding area as much as a depth smaller than the first depth when the case varies from the first state to the second state.

According to another aspect of the present invention, the protrusion may move in the sliding area so as to correspond to a difference in length between the front case and the rear case.

According to another aspect of the present invention, a plurality of slits may be formed on a lateral side of the rear case.

According to another aspect of the present invention, a corrugated area may be formed on at least a portion of rear case, a thickness of the corrugated area may vary from a first thickness to a second thickness periodically.

According to another aspect of the present invention, the case may includes: a first region including a central portion of the case, the first region being bendable; a second region positioned between the first region and an end of the mobile terminal; and a third region positioned between the first region and another end of the mobile terminal.

According to another aspect of the present invention, the second and third regions may be flat.

According to another aspect of the present invention, the mobile terminal may further comprise inflexible components, the inflexible components may include a battery and a PCB, the inflexible components may be positioned in at least one of the second and third regions.

According to another aspect of the present invention, the flexible display may include a plurality of layers, at least one of the plurality of layers may include a silicon (Si) material.

According to another aspect of the present invention, the rear case may include: a first band disposed on the rear case in a longitudinal direction; a second band disposed on the rear case in the longitudinal direction, a portion of the second band being overlapped with the first band; the first band may include a plurality of convexities, the second band may include a plurality of concavities facing the plurality of convexities of the first band, and at least a portion of the plurality of the convexities may be fitted in the plurality of concavities.

According to another aspect of the present invention, the mobile terminal may further comprise: a wire connecting an end of the case to another end of the case; and a winding gadget connected to the wire, the winding gadget providing the wire with a tension.

According to another aspect of the present invention, the mobile terminal may further comprise a controller configured to control the display based on the change in the state of the case.

According to another aspect of the present invention, the controller may control the display based on at least one of: a speed of the change in the state of the case; an amount of the change in the state of the case; and a direction of the change in the state of the case.

According to another aspect of the present invention, the controller may control the display to display contents on a full screen when the state of the case changes from the second state to the first state.

The effect of the mobile terminal according to the present invention will now be described.

According to at least one embodiment of the present invention, the state of the mobile terminal body can be changed smoothly, since the spring is disposed between the body and the front cover.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION OF THE EMBODIMENTS

Figure 1:
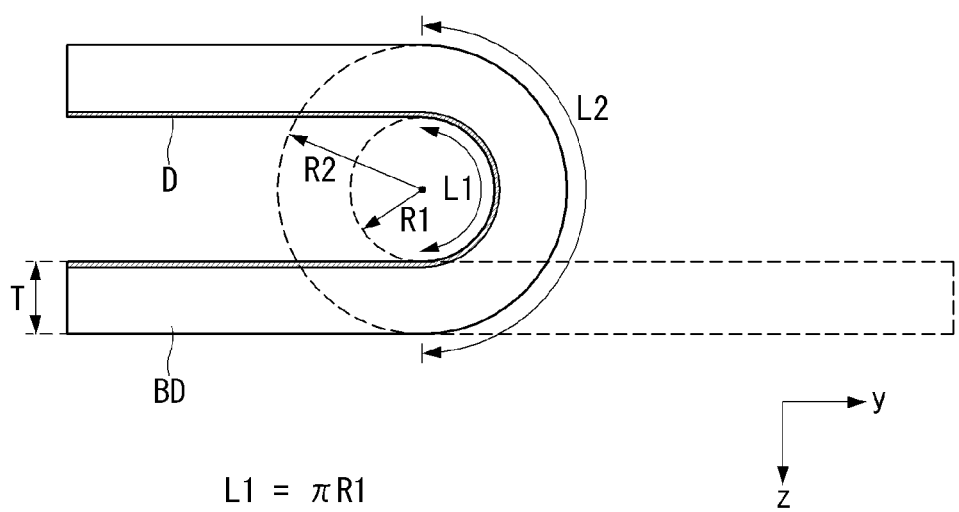
FIGS. 1 to 4 are views explaining an operation of the mobile terminal according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

The mobile terminal described in the present specification may be a mobile phone, a smart phone, a laptop computer, a digital broadcasting terminal, a PDA (personal digital assistant), a PMP (portable multimedia), slate PCs, tablet PCs, ultrabooks, wearable devices (e.g., smartwatches, smart glass, HMDs (head mounted displays), etc.).

However, it will be apparent to persons skilled in the art that the configuration according to the embodiments described herein may be applied to a fixed terminal such as a digital TV, a desktop computer, a digital signage, as well as the mobile terminal.

FIGS. 1 to 4 are views for explaining operations of a mobile terminal according to an embodiment of the present invention.

Figure 2:
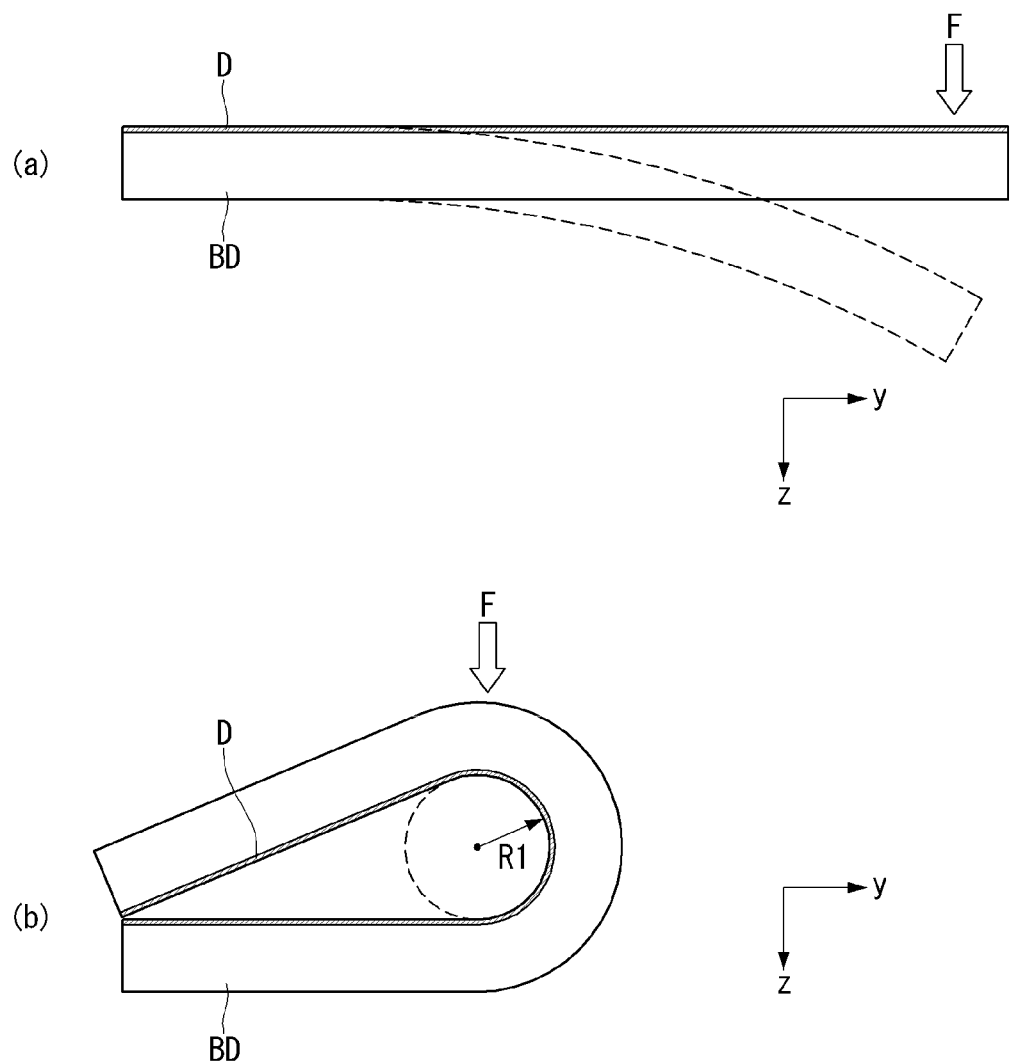

Referring to FIGS. 1 and 2, the mobile terminal 100 may be of a foldable type. For example, the body BD may be folded in such a manner that an end and another end of the body BD come close to each other and/or in contact with each other. The body BD may be provided with a display D.

Referring to FIG. 1, the display D may be formed on at least one side of the body BD. The display D may be formed, for example, on the front surface of the body BD. The display D may form an outer appearance of the mobile terminal 100 at a certain viewpoint, for example, at a front view. This may be different from the conventional folder phone. In other words, unlike the conventional folding mobile phone having a display area on a part of one side, the mobile terminal 100 according to the embodiment of the present invention includes a display elongated from an end to another end of the body.

The display D may be flexible. When the body BD is folded, the display D can be also folded accordingly. This may be a feature different from the conventional display. The flexible display D may be located on substantially all areas of a surface of the body BD.

The mobile terminal 100 may have a certain thickness. For example, the mobile terminal 100 may have a thickness T in the Z direction. The thickness of the mobile terminal 100 may be the sum of the thicknesses of components of the mobile terminal including the body BD and the display D in the direction Z.

The mobile terminal 100 may be in the first state S1 or the second state S2.

The first state S1 may be a state in which the body BD is unfolded. The body BD can be divided into a plurality of regions. The first state may be a state in which the plurality of regions of the body BD are arranged in the same plane. In the first state S1, the mobile terminal 100 may look like as a stick.

In the second state S2, the body BD may be bent. For example, the second state S2 may be a state in which a region of the body BD is folded to another region. In the second state S2, the length of the mobile terminal 100 can be seen to be about half.

A difference in length between the inner side surface and the outer side surface of the body BD may occur during the transition of the mobile terminal 100 from the first state S1 to the second state S2. The difference in length between the inner side surface and the outer side surface of the body BD may occur due to the thickness T of the mobile terminal 100. Due to the thickness T, a length difference may occur between the first radius R1, which is the inner radius of the body BD, and the second radius R2, which is the outer radius of the body BD. The length of the outer surface of the body BD may be greater than the length of the inner surface of the body BD in the second state due to the difference between the first and second radii R1 and R2. In case that the outer length of the body (BD) is larger than the inner length of the body (BD), wrinkles may occur on the display (D).

The display D may be damaged if the display D is folded flat. In the second state S2, the first radius R1 of the inner side of the body BD may be required. Therefore, the mobile terminal 100 may need a structure for maintaining the first radius R1 of the inner side surface of the body in the second state.

Referring to FIG. 2(a), the mobile terminal 100 in the first state can resist the external force F. For example, even when an external force F in the Z direction is applied, the first state of the mobile terminal 100 can be maintained without being deformed.

Referring to FIG. 2(b), the mobile terminal 100 in the second state can resist the external force F. For example, even if an external force F in the Z direction is applied, the first radius R1 of the mobile terminal in the second state can be maintained.

Figure 3:
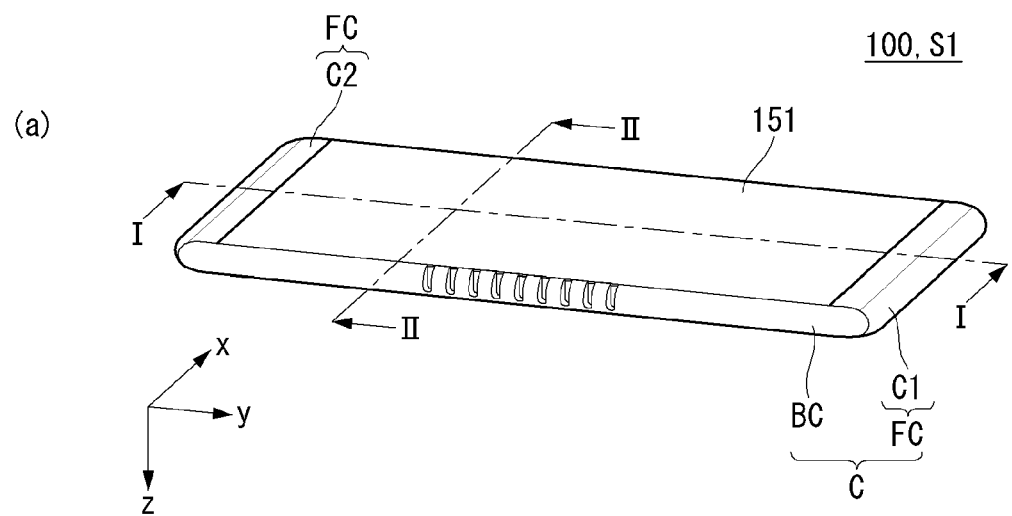
Figure 3:
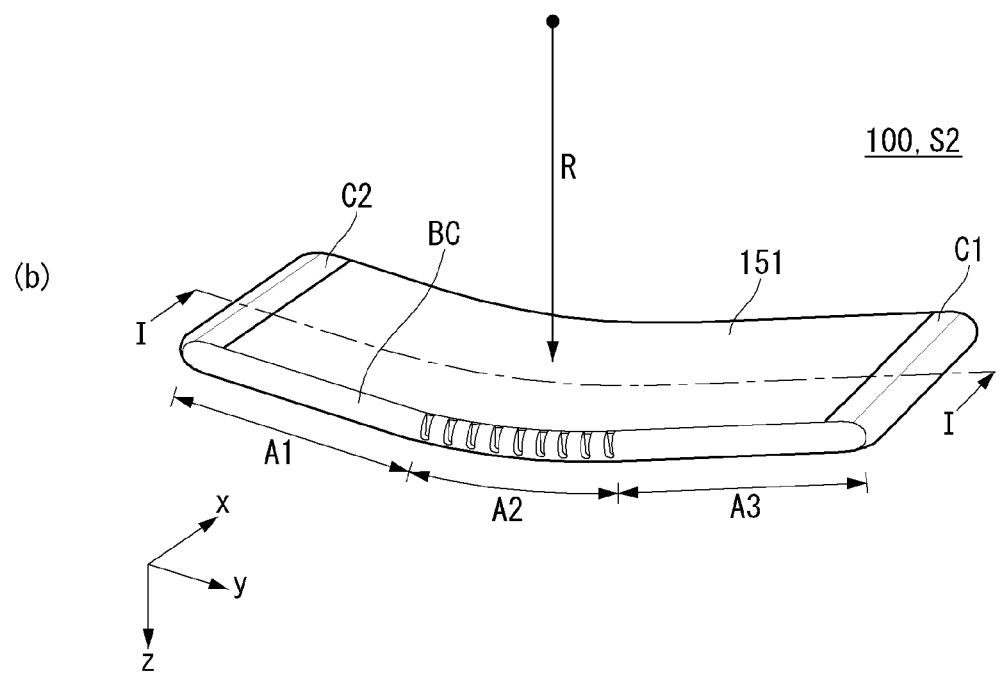
Figure 4:
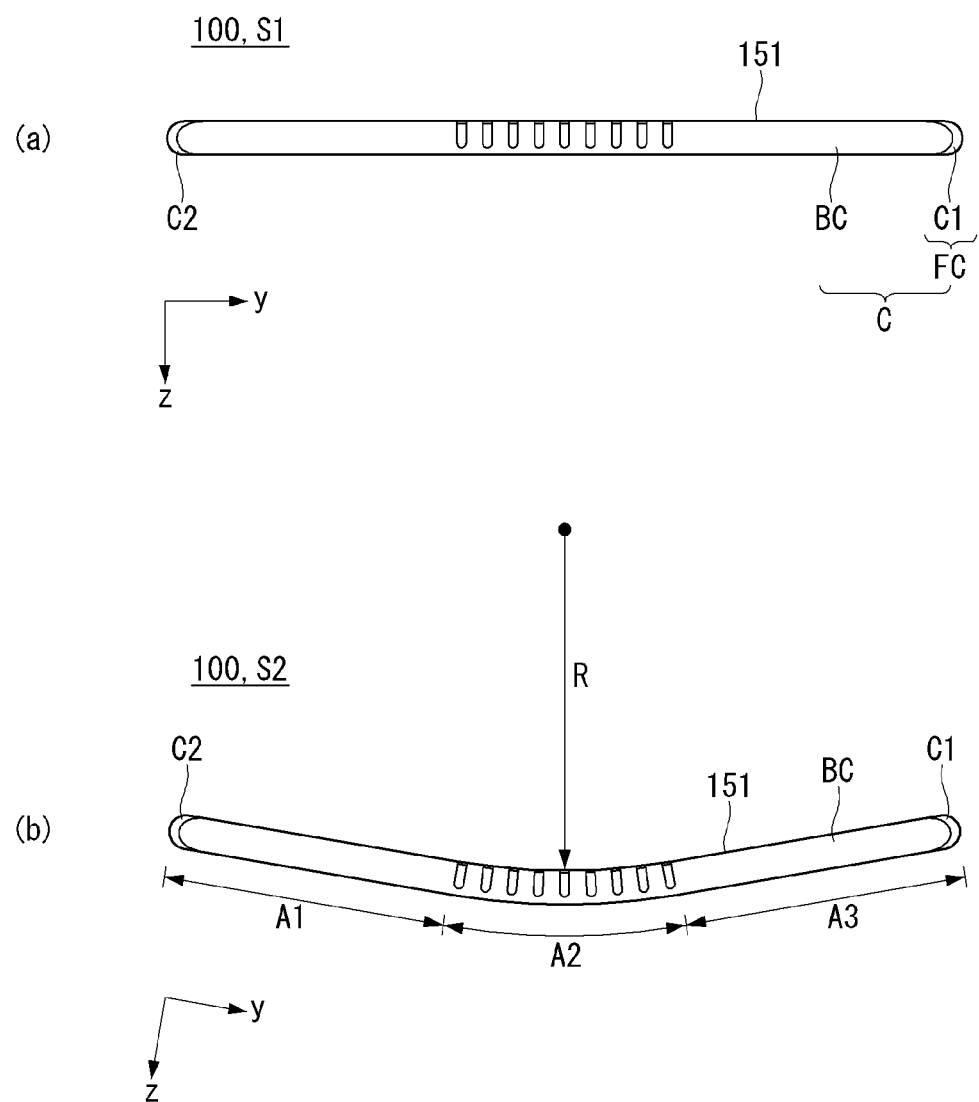

Referring to FIGS. 3 and 4, at least a portion of the mobile terminal 100 according to an exemplary embodiment of the present invention may be bent.

A portion of the case C of the mobile terminal 100 may be bent. Another portion of the case C of the mobile terminal 100 may be unfolded.

As shown in FIG. 3(a) and FIG. 4(a), the mobile terminal 100 may be in the first state S1. In the first state S1, the case C may be flat. For example, the front case FC and the rear case BC may be in parallel with each other. In the first state S1, the display 151 may be located on the X-Y plane.

As shown in FIGS. 3(b) and 4(b), the mobile terminal 100 may be in the second state S2. In the second state S2, the case C may be in a bent state. In the second state S2, a portion of the display 151 may deviate from the X-Y plane.

The mobile terminal 100 may be divided into a plurality of regions. For example, the mobile terminal 100 may be divided into first to third regions A1 to A3. The first region A1 of the mobile terminal 100 may be adjacent to the second bezel C2 which is positioned at an end of the mobile terminal 100. The third region A3 of the mobile terminal 100 may be adjacent to the first bezel C1 which is positioned at another end of the mobile terminal 100. The second region A2 of the mobile terminal 100 may be located between the first region A1 and the third region A3. The second region A2 of the mobile terminal 100 may connect the first region A1 to the third region A3. The first to third regions A1 to A3 of the mobile terminal 100 may be arranged in the longitudinal direction of the mobile terminal 100. The longitudinal direction of the mobile terminal 100 may be the Y direction.

At least some of the first to third regions A1 to A3 of the mobile terminal 100 may be bendable regions. Among the first to third regions A1 to A3, at least one may be non-bendable regions. For example, the first and third regions A1 and A3 may not be capable to be bent, and the second region A2 may be capable to be bent.

The second region A2 can be bent to a degree of the curvature radius R. For example, the mobile terminal 100 may be bent such that the display 151 has a constant curvature.

Figure 5:
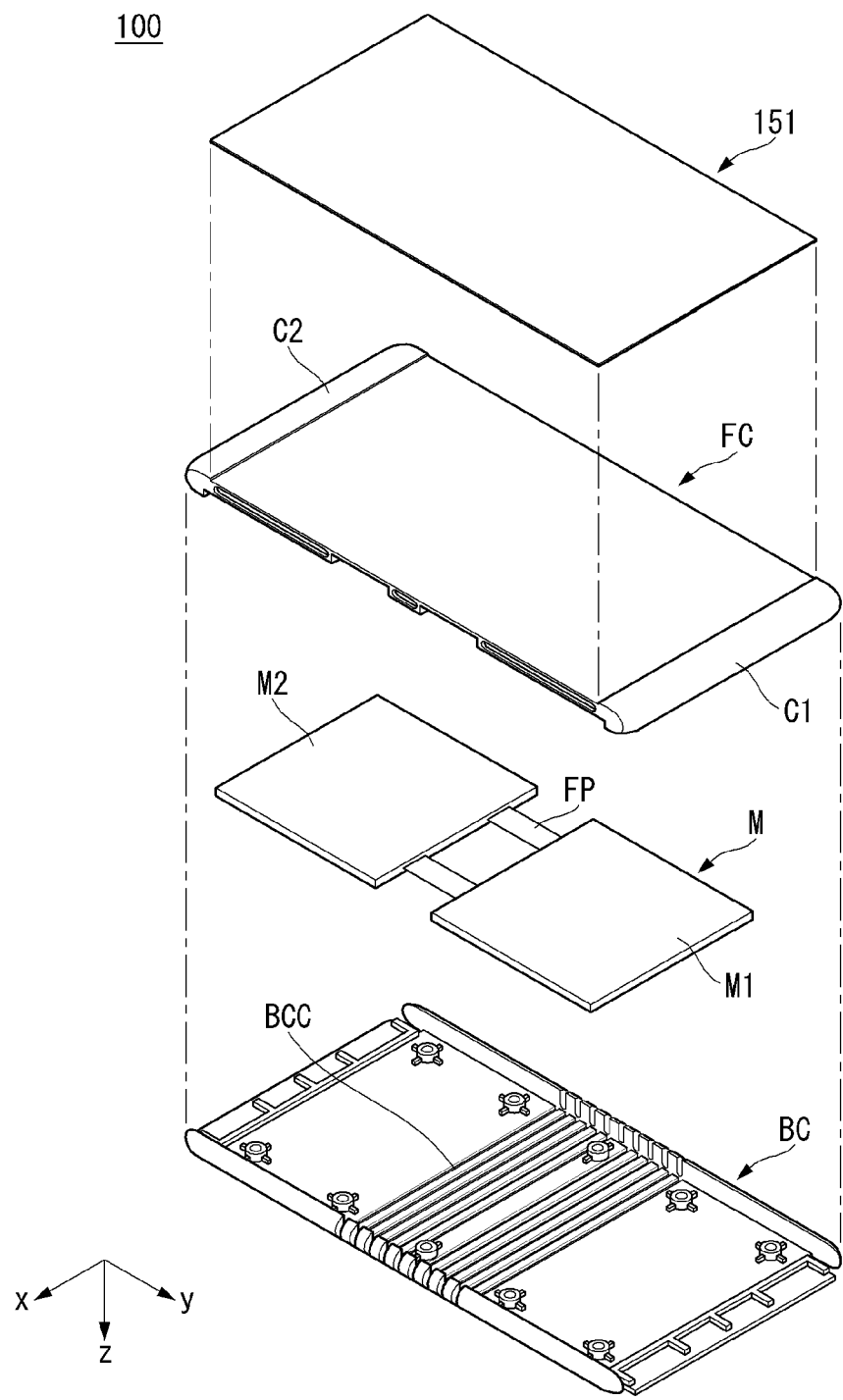
FIG. 5 is an exploded view of a mobile terminal according to an embodiment of the present invention.

FIG. 5 is an exploded view of a mobile terminal according to an embodiment of the present invention.

The mobile terminal 100 according to an embodiment of the present invention may include a display 151, a front case FC, a rear case BC and electronic components M positioned between the front case FC and the rear case BC. There may be a space between the front case FC and the rear case BC.

The display 151 may be located on the front surface of the mobile terminal 100.

The display 151 may be a flexible display. For example, if an external force is applied to the display 151, the display 151 can be bent according to the external force.

The front case FC may be a region covering the front side of the mobile terminal 100. The front case FC may accommodate a display 151. The display 151 may be in close contact with the front case FC. For example, the front case FC and the display 151 can be bent together.

At least a portion of the front case FC may be exposed to the outside. For example, an end and another end of the front case FC may be the first and second bezels C1 and C2. However, it is also possible that the display 151 substantially covers the front surface area of the front case FC.

The rear case BC may be coupled to the rear side of the front case FC. The electronic components M may be incorporated in the internal space between the rear case BC and the front case FC. In the rear case BC, a corrugated area BCC may be provided.

The corrugated area BCC may be located in the bendable region of the rear case BC. For example, the corrugated area BCC may be located in the middle area of the rear case BC. The corrugated area BCC can be formed such that the corresponding part of the rear case BC can be easily bent.

The rear case BC can slide with respect to the front case FC. For example, when the mobile terminal 100 is changed from the first state to the second state, a difference in length between the inner region and the outer region due to bending can be compensated for by sliding the rear case BC. Therefore, even if the mobile terminal 100 is bent, wrinkles may not occur in other components including the display 151.

The electronic components M may be various components necessary for the operation of the mobile terminal 100. For example, the electronic components M may include a battery, a PCB, a camera, an antenna, and the like.

At least a part of the electronic component M may be a component that is not capable of being bent. A normal PCB may be not capable of being bent. FPCB may be capable of being bent to some extent.

The electronic components M may be divided into specific areas. For example, the electronic component M may include a first component group M1 and a second component group M2. The first and second component groups M1 and M2 may include components that are not bent. The components that are not bent may be referred to as inflexible components.

The first and second component groups M1 and M2 may be positioned to correspond to the first and third regions A1 and A3. The first and second component groups M1 and M2 may be arranged in a non-bendable region. The first and second component groups M1 and M2 may be connected by at least one FPCB FP.

Figure 6:
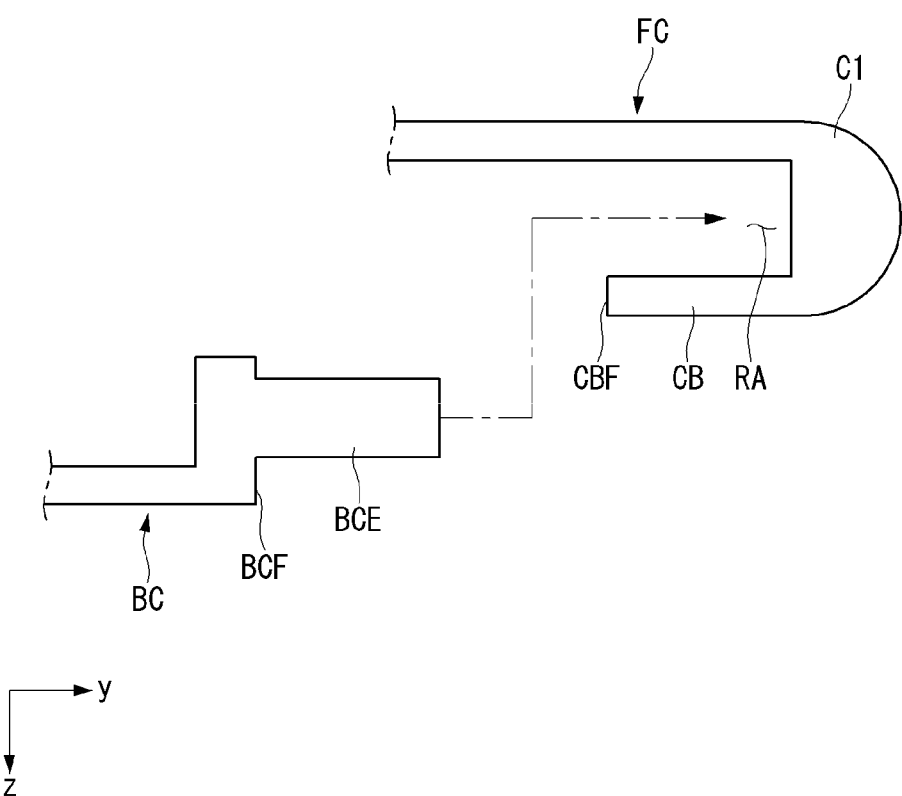
FIG. 6 is a view showing a coupling relationship between a front case and a rear case of the mobile terminal of FIG. 5.

FIG. 6 is a view showing a coupling relationship between a front case and a rear case of the mobile terminal of FIG. 5.

The rear case BC can be coupled to the front case FC so as to slide with respect to the front case FC.

The front case FC may extend from the first bezel region C1 toward the rear side of the mobile terminal 100. For example, the front case FC may include ribs CB extending from the first bezel C1 to the rear surface of the mobile terminal 100. At least a part of the ribs CB may be exposed to the rear of the mobile terminal 100. By the ribs CB, the sliding area RA can be formed in the first bezel C1. The sliding area RA may be formed to have a predetermined length in the longitudinal direction of the mobile terminal 100. The longitudinal direction of the mobile terminal 100 may be the Y direction.

The rear case BC can be inserted into the sliding area RA of the front case FC. For example, the protrusion BCE of the rear case BC can be coupled to the sliding area RA.

When the protrusion BCE is inserted into the sliding region RA, the protrusion BCE can be slid in the Y direction according to the bending of the mobile terminal 100.

When the mobile terminal 100 is in the first state, the protrusion BCE can be deeply inserted into the sliding area RA. The protrusion BCE can be inserted into the sliding area RA so that the first area CBF of the rib CB and the second area BCF of the rear case BC are in contact with each other.

As the state of the mobile terminal 100 is changed to the second state, the protrusion BCE can be moved within the sliding area RA. The first area CBF of the rib CB can be moved away from the second area BCF of the rear case BC. The first area CBF of the rib CB may not contact the second area BCF of the rear case BC.

The movement of the protrusion BCE can compensate for the difference in distance between the front surface and the rear surface of the mobile terminal 100, which is generated when the mobile terminal 100 is bent. That is, the distance difference due to the bending of the mobile terminal 100 can be compensated by the movement of the protrusion BCE. The structure of the first bezel C1 has been described above, but the structure of the second bezel C2 may be the same as that of the first bezel C1 which is symmetric to the second bezel C2.

Figure 7:
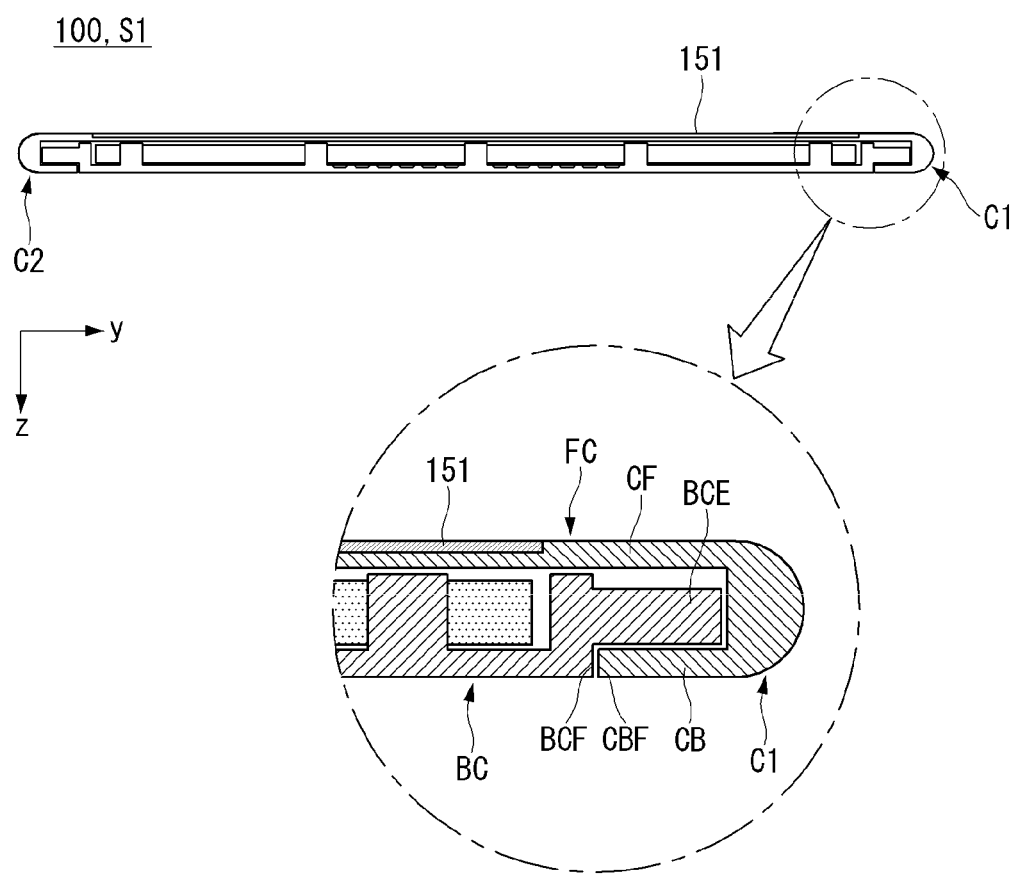
FIGS. 7 to 9 are views showing a relationship between the front case and the rear case in accordance with the change in the state of the mobile terminal.
Figure 8:
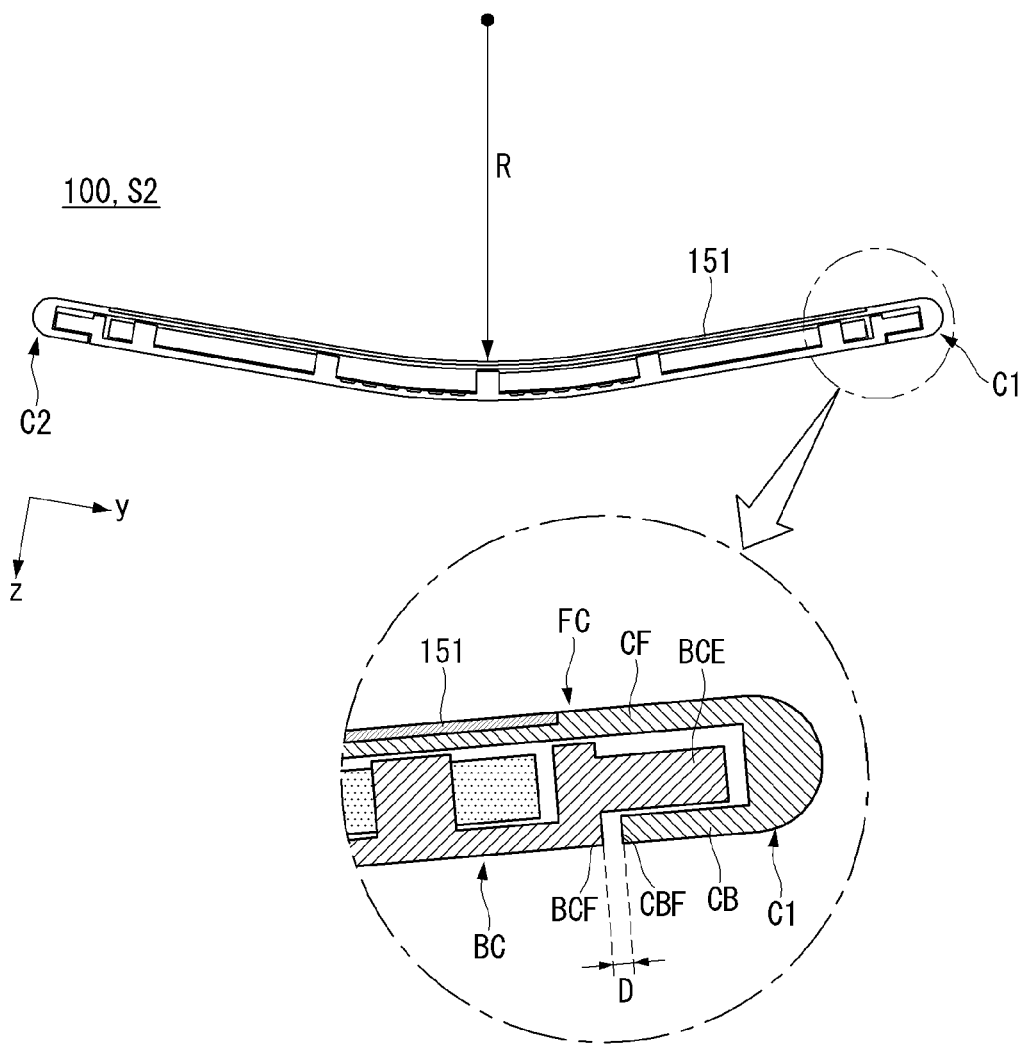
Figure 9:
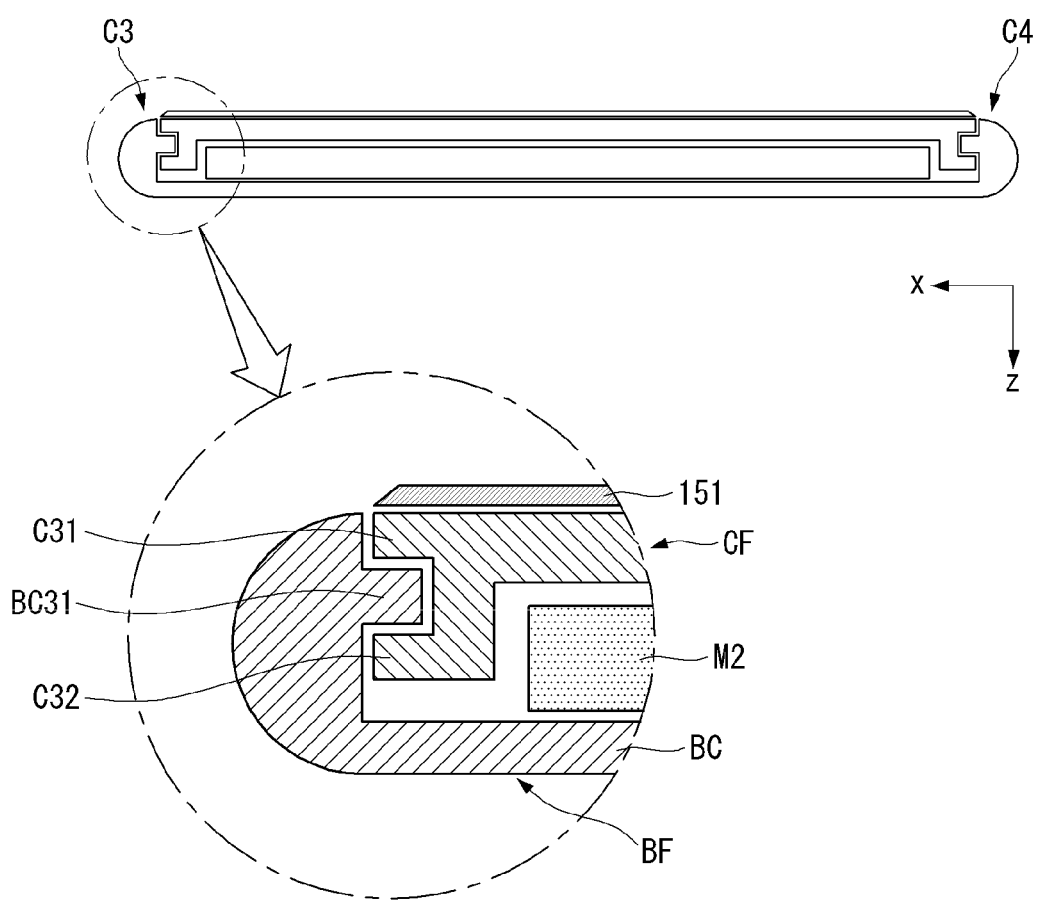

FIGS. 7 to 9 are views showing the relationship between the front case and the rear case according to the state change of the mobile terminal of FIG. 5.

The front case CF and the rear case BC may include a structure in which one of them slides relative to the other.

FIGS. 7 and 8 are sectional views of FIG. 3 taken along the line I-I.

Referring to FIG. 7, in the first state, the second area BCF of the rear case BC and the first area CBF of the front cover FC may be in contact with or close to each other. In the first state, the protrusion BCE can be inserted most deeply into the sliding area RA.

Referring to FIG. 8, in the second state, the first area CBF and the second area BCF may be spaced apart from each other. The protruding portion BCE may slide in the sliding region RA and can be retracted from the bezel C1.

Due to the sliding movement of the protrusion BCE, a spacing distance D may occur between the first area CBF and the second area BCF.

The spacing distance D may correspond to the curvature radius R. For example, the spacing distance D between the first bezel C1 and the rear case BC may be about ½ of the difference in distance between the front side and the rear side of the mobile terminal 100. The first and second bezels C1 and C2 can compensate for the difference in distance due to the bending of the mobile terminal 100.

Referring to FIG. 9, the mobile terminal 100 according to an embodiment of the present invention may include a structure that is slidably moved along the third and fourth bezels C3 and C4.

FIG. 9 is a cross-sectional view of FIG. 3 taken along the II-II line.

The third and fourth bezels C3 and C4 may be formed on both sides of the mobile terminal 100 in the longitudinal direction. That is, the third and fourth bezels C3 and C4 may be located at both ends of the mobile terminal 100 in the transversal direction. The sliding movement may occur in the third and fourth bezel C3 and C4 as well as the sliding movement of the first and second bezels C1 and C2 at both ends of the mobile terminal 100.

In the front case CF, first and second ribs C31 and C32 may be formed. The rear case BF may have a third rib BC31 corresponding to the first and second ribs C31 and C32. The third rib BC31 may be inserted into a space formed by the first and second ribs C31 and C32. The space formed by the first and second ribs C31 and C32 may be located between the first and second ribs C31 and C32.

The third rib BC31 inserted into the space between the first and second ribs C31 and C32 can be slidably moved. That is, in response to the state change of the mobile terminal 100, the third rib BC31 in the space between the third and fourth bezel C3 and C4 can be slidably moved.

FIGS. 10 to 14 are views showing a rear case structure of the mobile terminal of FIG. 5.

The rear case BC may include a structure for bending the mobile terminal 100.

Figure 10:
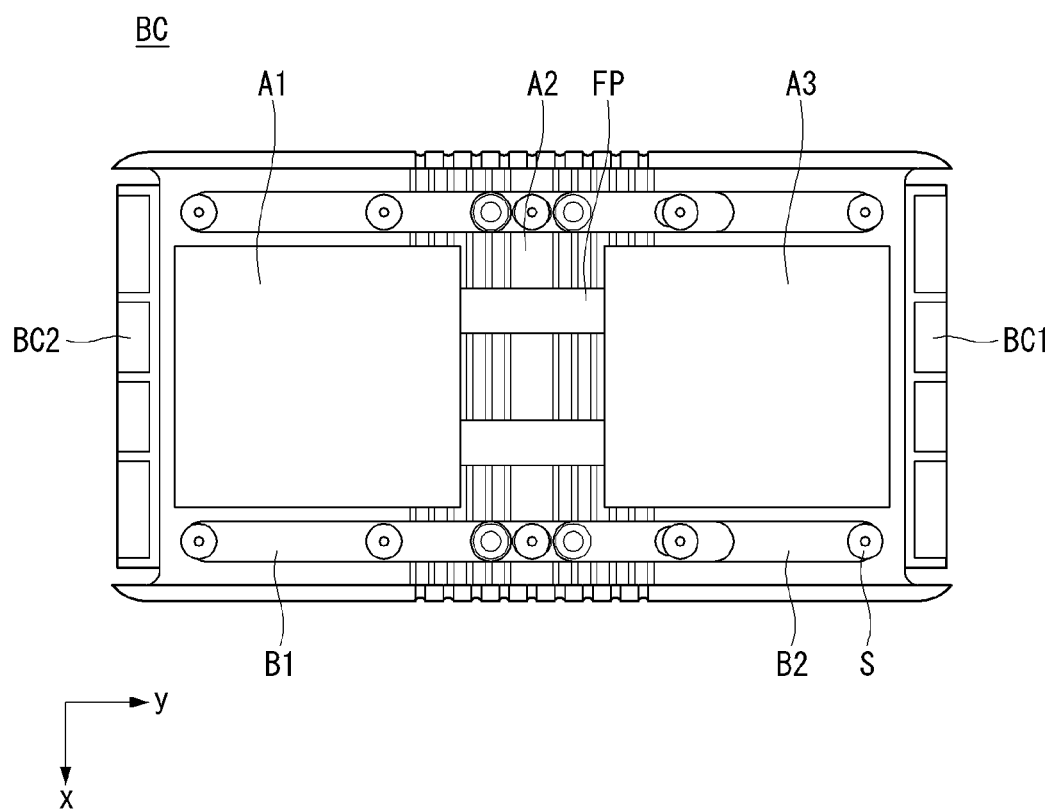
FIGS. 10 to 14 are views showing a configuration of the rear case of the mobile terminal of FIG. 5.
Figure 11:
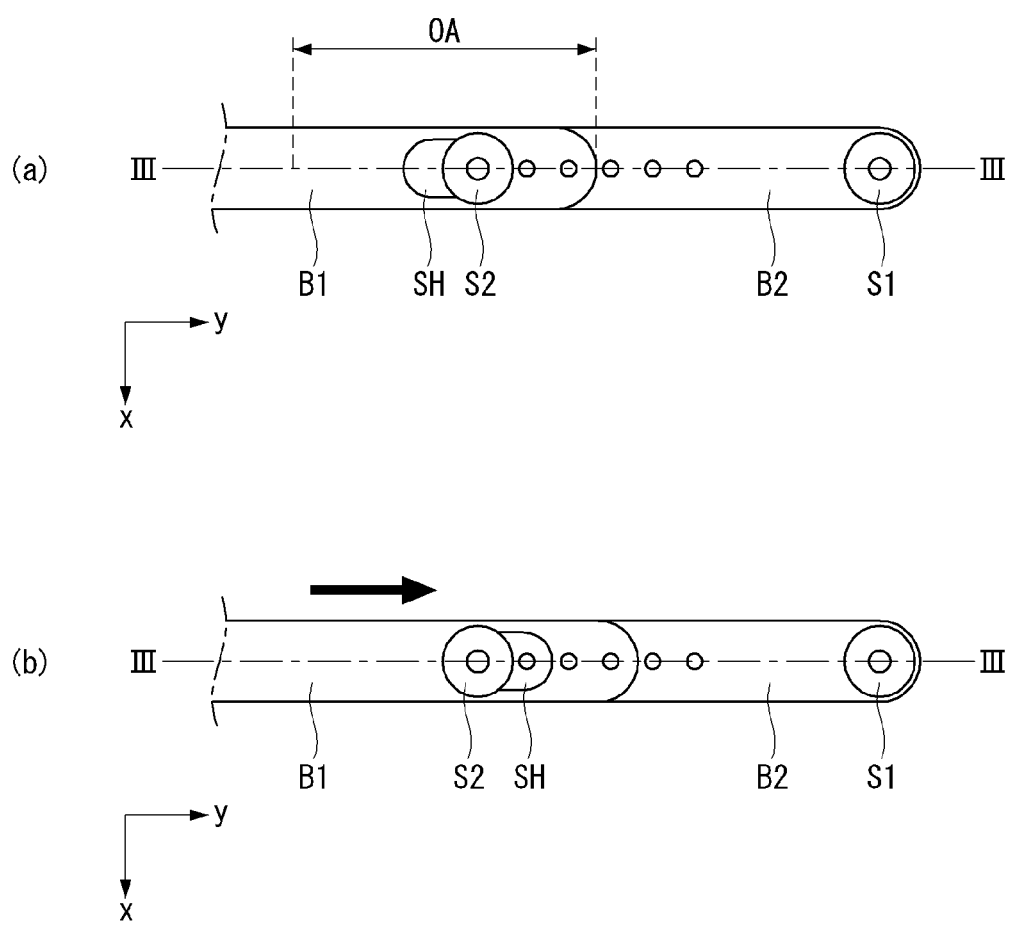

Referring to FIG. 10, the rear case BC may include a guide screw S and the first and second bands B1 and B2, wherein the guide screw S is coupled to the first and second bands B1 and B2.

The first and second bands B1 and B2 may be arranged in the longitudinal direction of the mobile terminal 100. The first and second bands B1 and B2 may be positioned in a direction in which the mobile terminal 100 is bent. The positions of the first and second bands B1 and B2 may be changed due to the bending of the mobile terminal 100. Or the mobile terminal 100 may be bent due to the positional change of the first and second bands B1 and B2.

The first and second bands B1 and B2 may be disposed on both opposite sides of the mobile terminal 100 in the longitudinal direction. Therefore, the bending of the mobile terminal 100 can be stably guided.

A plurality of guide screws S may be disposed along the first and second bands B1 and B2. At least some of the guide screws S may be fixed to the first band B1 and/or the second band B2. At least another portion of the guide screws S may be inserted into guide holes SH (referring to FIG. 11) of the first band B1 and/or the second band B2.

Referring to FIG. 11(a), the first band B1 and the second band B2 may overlap. For example, the first and second bands B1 and B2 may overlap in the overlap area OA.

The guide screw S may include a first guide screw S1 positioned on the first band B1 and a second guide screw S2 positioned on the overlap area OA. The first guide screw S1 may be in close contact with the first band B1. The second guide screw S2 can guide the first band B1 to slide. That is, the first band B1 may be coupled to the second guide screw S2, the first band B1 may not be fixed by the second guide screw S2. The second guide screw S2 may be inserted into the guide hole SH. The guide hole SH may be formed on the first band B1.

Referring to FIG. 11(b), when the mobile terminal 100 is bent, the first band B1 can be moved. The movement of the first band B1 may mean the movement of the guide hole SH.

Figure 12:
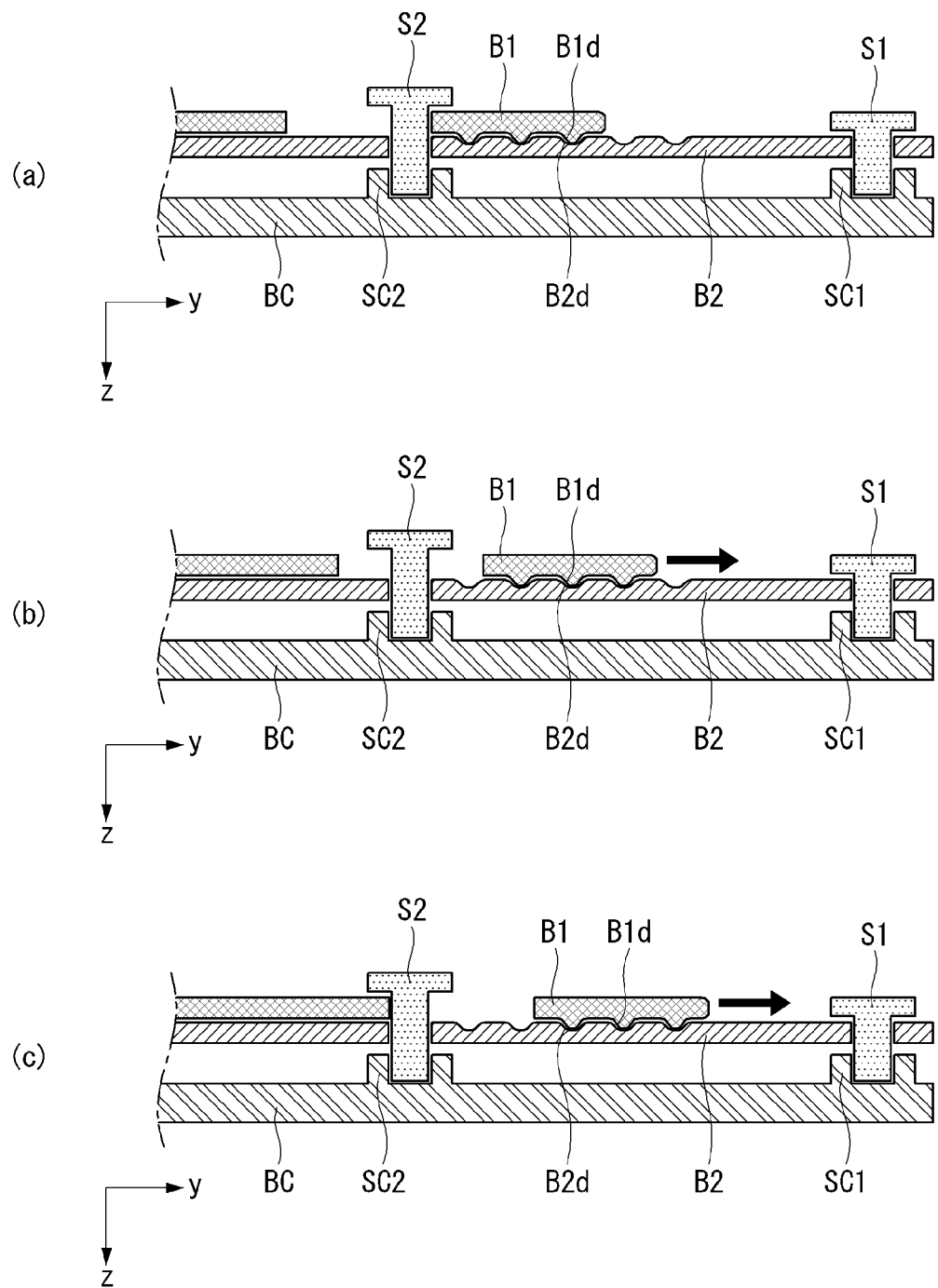

FIG. 12 shows a cross section of the first and second bands B1 and B2 taken along the line III-III.

Referring to FIG. 12(a), the first and second guide screws S1 and S2 may be inserted into the first and second coupling holes SC1 and SC2 formed in the rear case BC.

The first and second bands B1 and B2 may be formed with first and second concavities and convexities B1d and B2d corresponding to each other. Due to the first and second concavities and convexities B1d and B2d, the first and second bands B1 and B2 can be kept fixed at specific positions. That is, if an external force equal to or greater than a certain magnitude is not applied, the first and second concavities and convexities B1d and B2d can be maintained to be coupled with each other.

Referring to FIGS. 12(b) and 12(c), when a force greater than a certain magnitude is applied in the Y direction, the first band B1 can be moved in the Y direction. That is, when a force equal to or larger than the coupling force of the first and second concavities and convexities B1d and B2d is applied, the first band B1 can be moved by one step. The first concavities and convexities B1d can maintain the state of being coupled to the second concavities and convexities B2d until a force greater than a certain magnitude is applied. That is, the mobile terminal 100 can be maintained in a bent state to a specific position.

Figure 13:
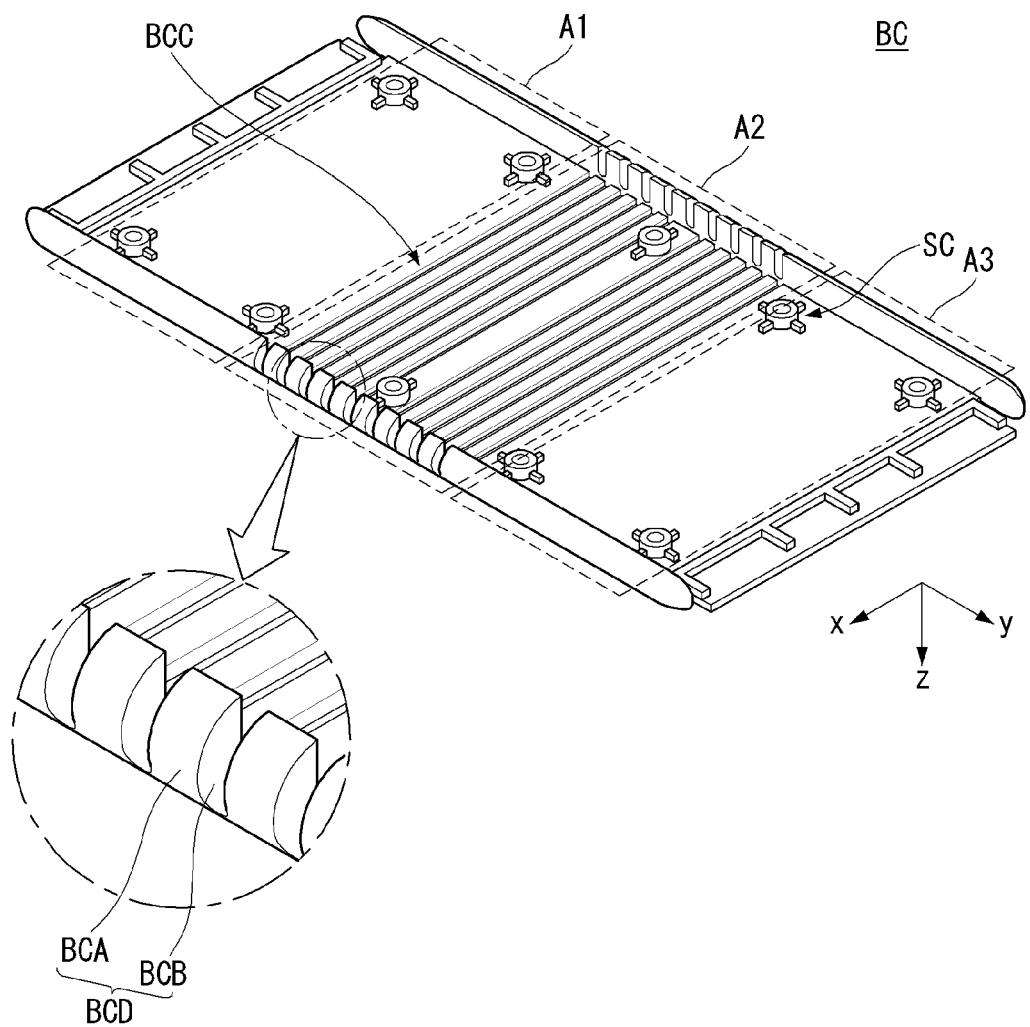
Figure 14:
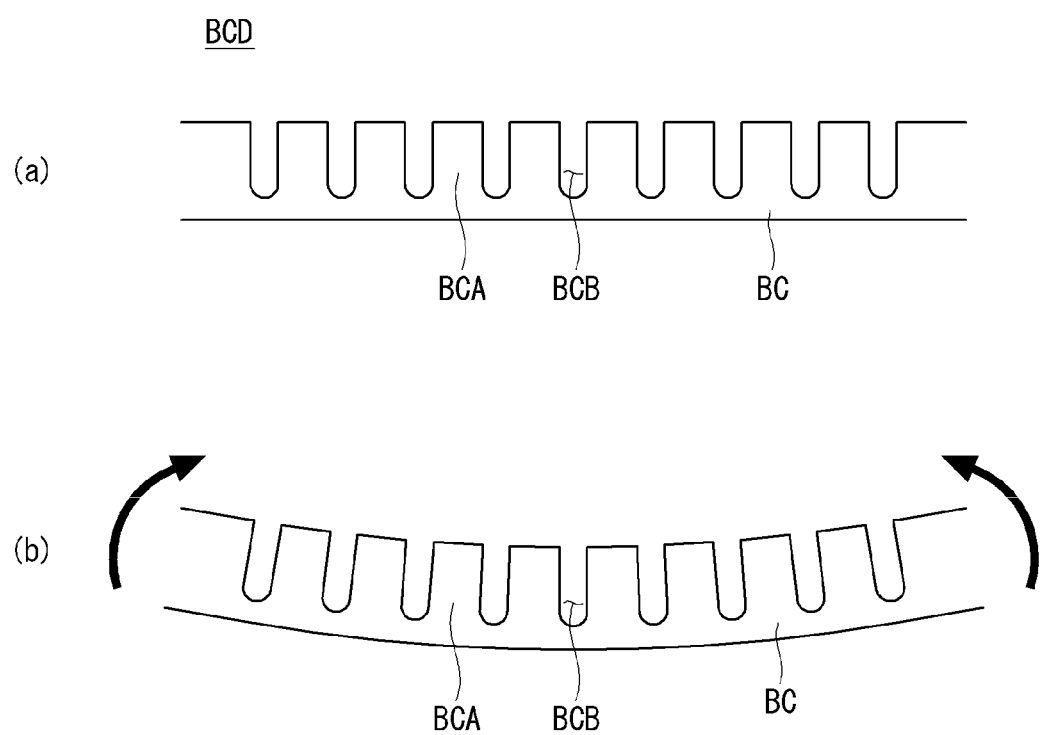

Referring to FIG. 13, a corrugated area BCC, a spacing structure BCD, and a coupling hole SC may be provided in the rear case BC.

The corrugated area BCC may be formed in at least a part of the second region A2 of the rear case BC. The corrugation area BCC may be a concavities and convexities formed on the bottom surface of the rear case BC. For example, the thickness of the bottom surface of the rear case BC may be varied periodically. Due to the presence of the corrugated area BCC, the mobile terminal 100 can be easily bent at the second region A2.

The spacing structure BCD may be formed in the second region A2 of the rear case BC. For example, the spacing structure BCD may be formed on the side wall of the second region A2. The spacing structure BCD can allow the mobile terminal 100 to be easily bent. The spacing structure BCD may include ribs BCA and a slit BCB between the ribs BCA. The slit BCB may be referred to as a spacing portion BCB.

Referring to FIG. 14(a), the spacing structure (BCD) may include a plurality of ribs BCA and a spacing portion BCB between the ribs BCA.

Referring to FIG. 14(b), when an external force is applied, the spacing between the ribs BCA can be varied. For example, the thickness of the spacing portion BCB can be reduced. The resistance of the rear case BC to the external force can be reduced at an area where the spacing portion BCB is located. Therefore, the rear case BC can be more easily deformed.

Figure 15:
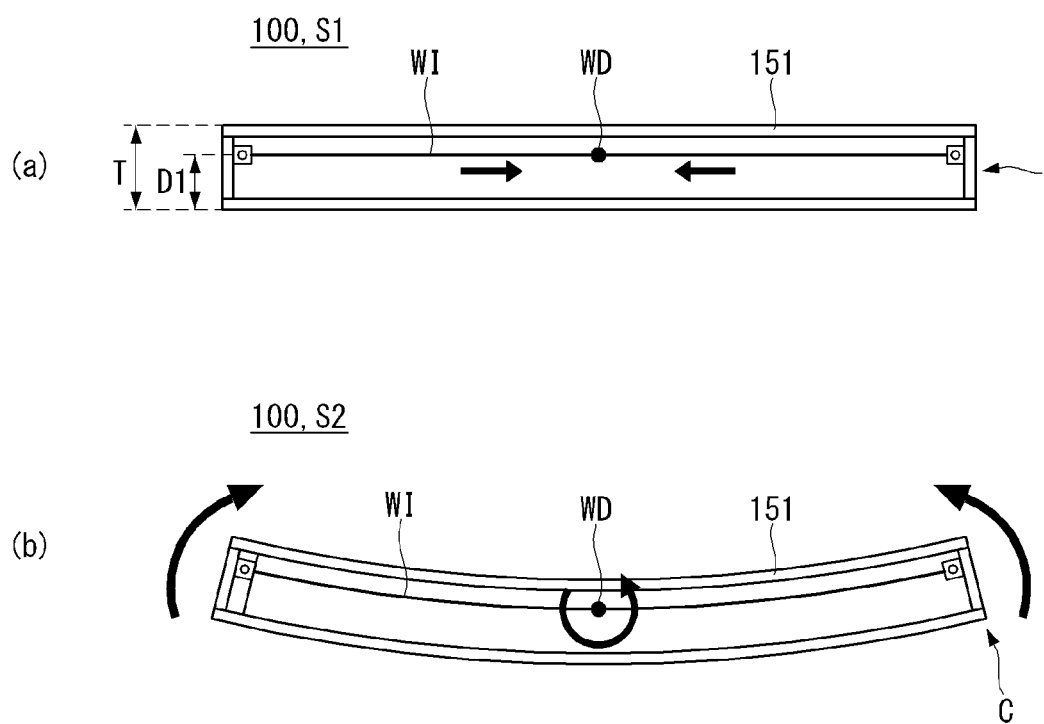
FIGS. 15 and 16 are views showing an operation of the mobile terminal of FIG. 5.
Figure 16:
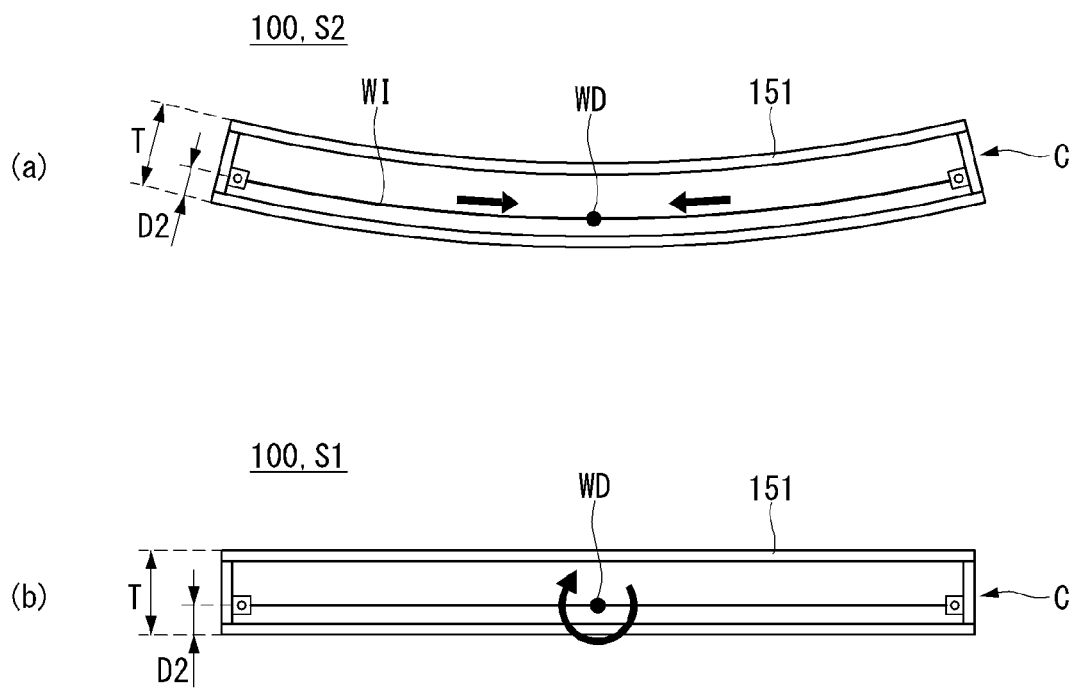

FIGS. 15 and 16 are views showing operations of the mobile terminal of FIG. 5.

The mobile terminal 100 may include a structure for causing the mobile terminal 100 to be deformed from the first state to the second state or vice versa in accordance with the control signal of the controller 180.

Referring to FIG. 15(a), the mobile terminal 100 may be flat. In the mobile terminal 100, a wire WI and a winding gadget WD may be provided.

The wire WI may be located inside the case C. For example, the wire WI may be coupled to the mutually opposing inner wall surfaces of the case C.

The wire WI may be located at a distance D1 from the rear surface of the mobile terminal 100. The distance D1 may be greater than ½ of the thickness T of the mobile terminal 100. That is, the wire WI may be positioned relatively close to the display 151.

The winding gadget WD may include a motor that can wind or unwind the wire WI. That is, the winding gadget WD can change the tension of the wire WI. The winding gadget WD may provide the wirer the tension.

Referring to FIG. 15(b), the winding gadget WD can rotate and wind the wire WI. When the winding gadget WD winds the wire WI, the mobile terminal 100 can be bent. The mobile terminal 100 can be bent toward the display 151 by the tension of the wire WI placed close to the display 151.

Referring to FIG. 16(a), the wire WI may be located at a distance D2 from the rear surface. The distance D2 may be smaller than ½ of the thickness T of the mobile terminal 100. The wire WI can be positioned relatively close to the rear surface of the case C.

Referring to FIG. 16(b), when the winding gadget WD winds the wire, the mobile terminal 100 can be changed to the first state by the tension. The mobile terminal 100 may be changed from an initial bent state to a flat state by the tension of the wire WI.

Figure 17:
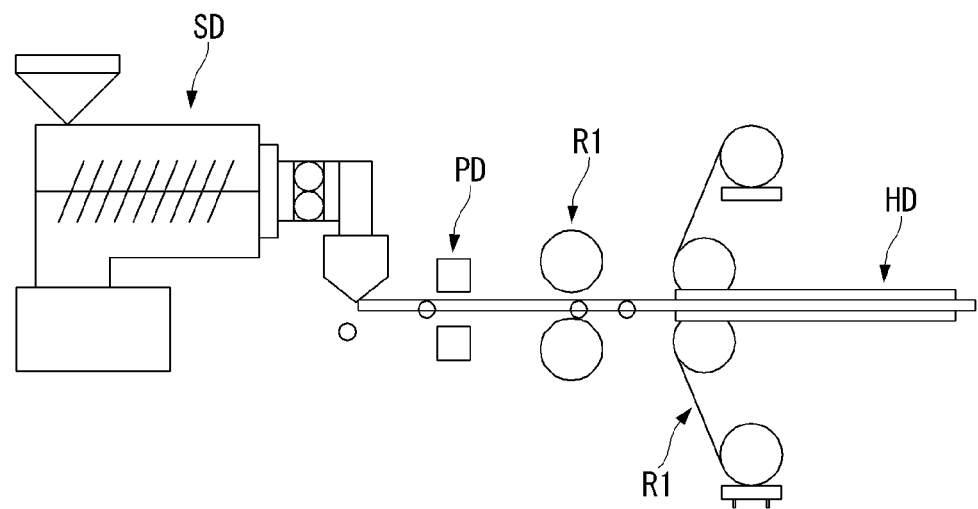
FIG. 17 is a view showing a manufacturing process of the flexible display of FIG. 5.

FIG. 17 is a view showing a manufacturing process of the flexible display of FIG. 5.

The display 151 according to an embodiment of the present invention can be produced through a certain process.

A process of ejecting silicon SD may proceed. For example, a process of ejecting silicon SD in a liquid state in a semi-cured state may be performed. Silicon SD can be ejected in a plate shape.

Silicon SD may be silicon for optical. For example, silicon SD may be an optical silicone having a molecular structure in which an alkyl group is bonded to a silicon molecule. The alkyl group may be at least one of Methyl, Vinyl-Methyl, Phenyl-Vinyl-Methyl and Fluoro-Vinyl-Methyl.

A curing agent may be added to silicon SD. That is, a curing agent to which platinum (Pt) or the like is added may be used in order to prevent curing before the film is attached. The curing agent may be added to silicon SD under a constant temperature.

A process of adhering the primer PD to the ejected silicon SD can be performed. The primer PD can be adhered to silicon SD to enhance adhesion and prevent light distortion. The primer PD can be bonded to the silicon SD at a certain temperature or more for the purpose of enhancing the bonding strength of the material.

The process of adhering the film HD to the primer PD using the second roller R2 may be performed after the silicon SD with the primer PD bonded thereto is pressed by the first roller R1. The film (HD) may have resistance to scratches and the like. The film (HD) may include printing for decorating.

Figure 18:
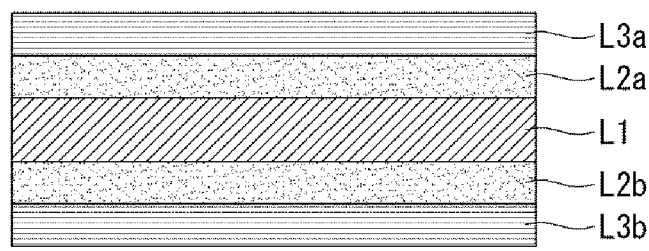
FIGS. 18 and 19 are views showing a flexible display produced through the manufacturing process of FIG. 17.
Figure 19:
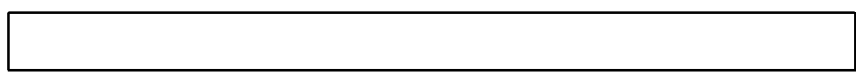
Figure 19:
Figure 19:
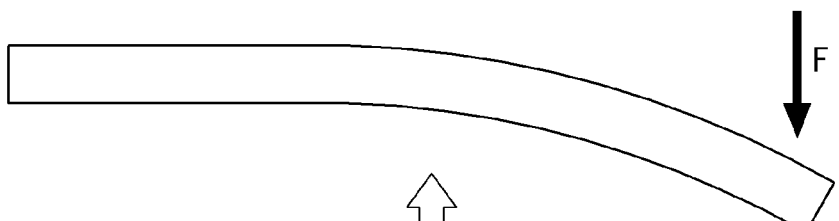
Figure 19:
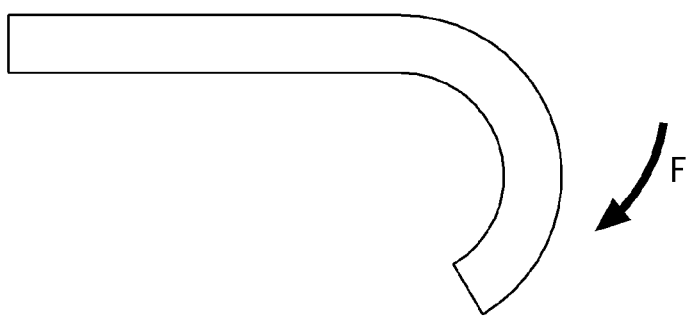

FIGS. 18 and 19 are views showing the flexible display produced according to the manufacturing process of FIG. 17.

The display 151 produced according to the manufacturing process according to an embodiment of the present invention may be flexible.

Referring to FIG. 18, the display 151 may include a silicon sheet layer L1, primer layers L2a and L2b, and film layers L3A and L3b. The display 151 may be a silicon-based multi-layer structure.

Referring to FIG. 19, the display 151 according to an embodiment of the present invention may be deformed correspondingly to an external force F applied thereto. The shape of the display 151 can be deformed in proportion to the magnitude of the external force F, for example. The display 151 can be recovered to the initial shape when the external force F is removed.

FIGS. 20 to 23 are views illustrating operations of a mobile terminal according to an embodiment of the present invention.

The controller 180 can perform an operation corresponding to the user's operation on the mobile terminal 100. For example, the controller 180 may perform an operation corresponding to an operation of a user bending the mobile terminal 100.

Figure 20:
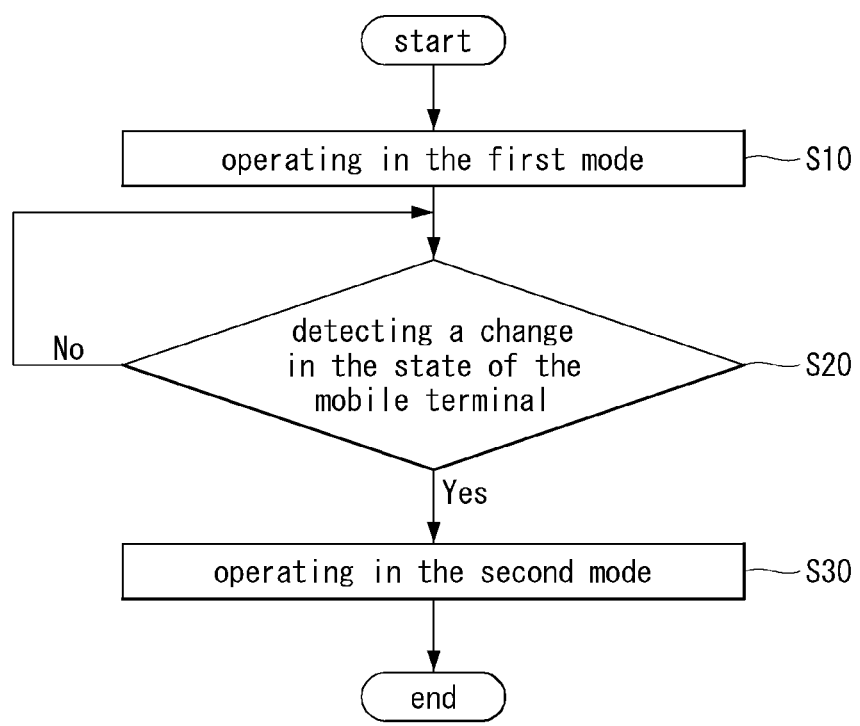
FIGS. 20 to 23 are views showing an operation of the mobile terminal according to an embodiment of the present invention.
Figure 21:
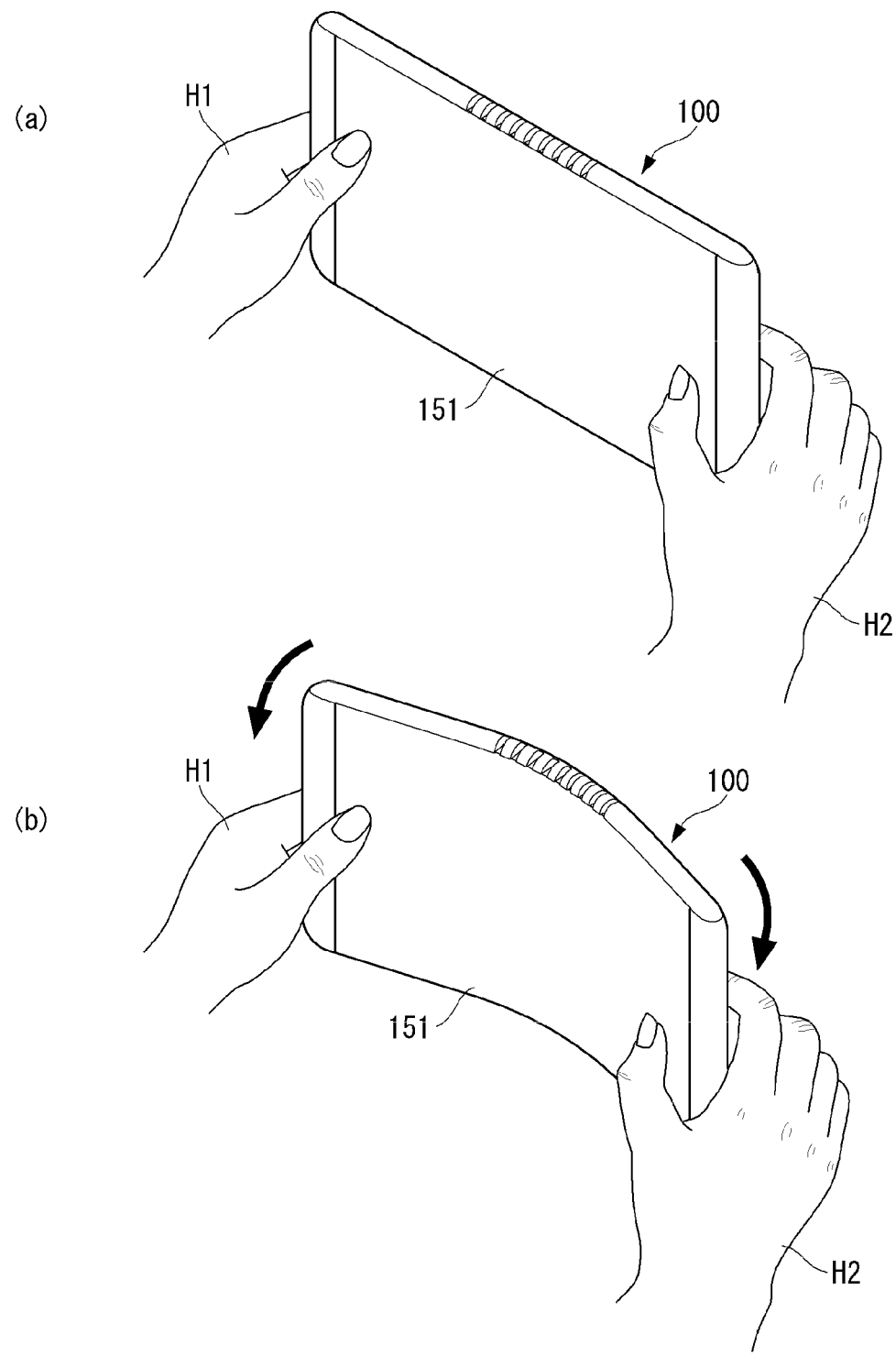
Figure 22:
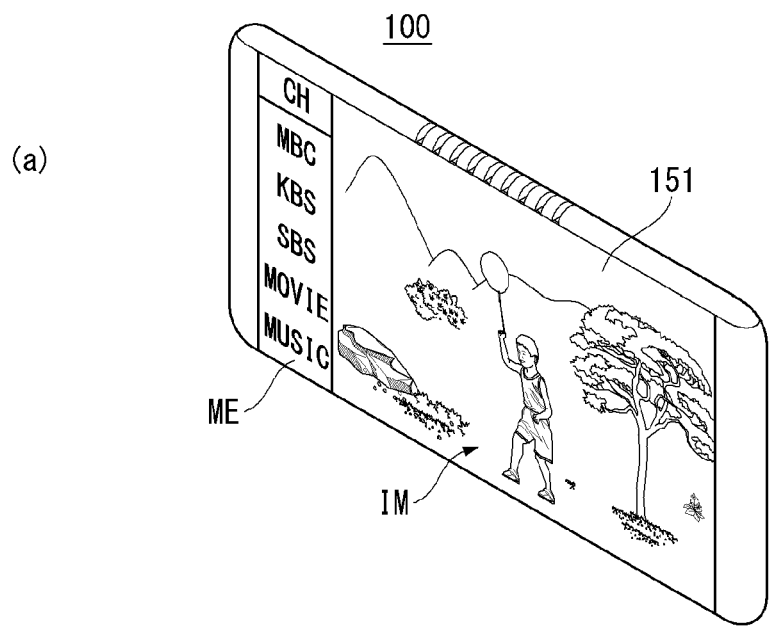
Figure 22:
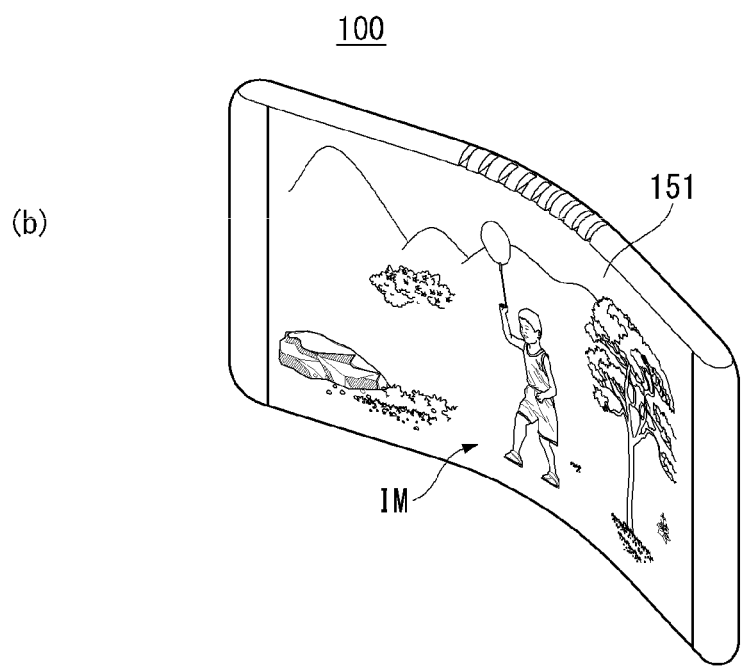
Figure 23:
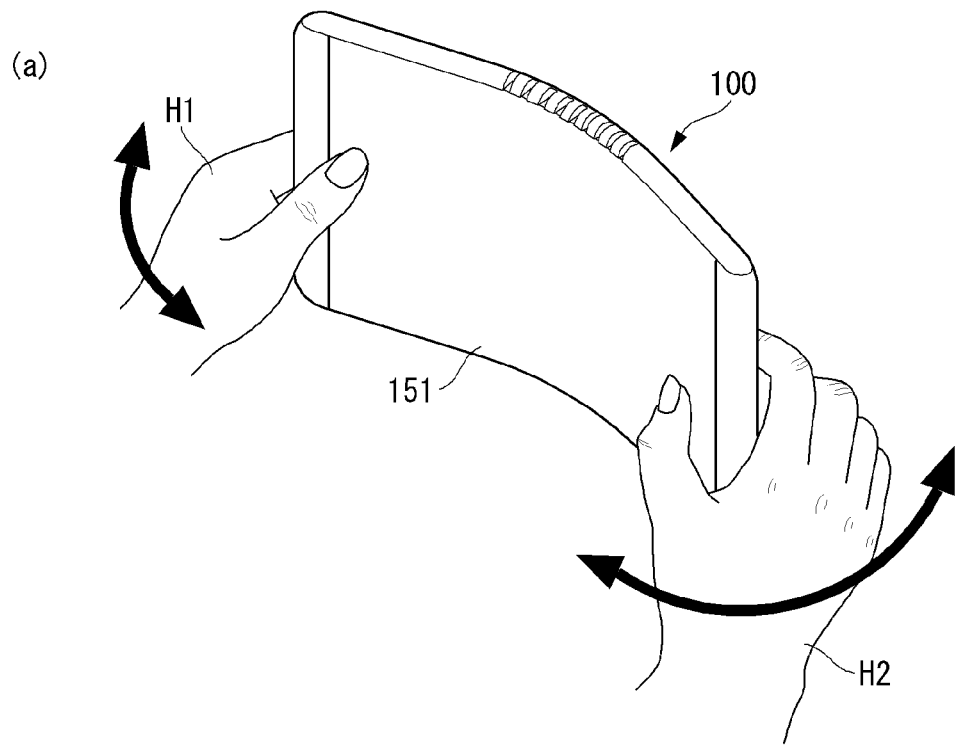
Figure 23:
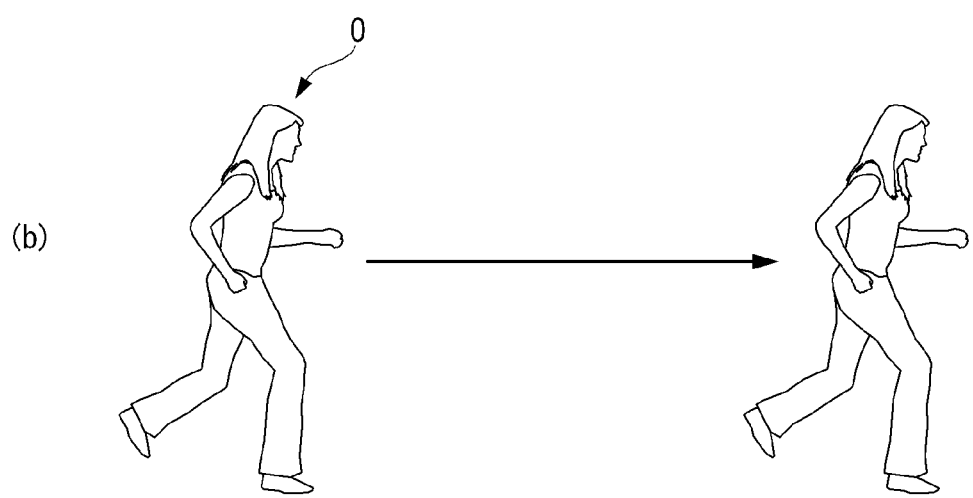

Referring to FIG. 20, the controller 180 may perform a first step S10 of operating in the first mode. The first mode may be, for example, a first state in which the mobile terminal 100 is flat.

The controller 180 may perform a second step S20 of detecting a change in the state of the mobile terminal 100. The state change of the mobile terminal 100 may be a change due to the bending operation for the mobile terminal 100. For example, it can be detected that a user holding the mobile terminal 100 has performed an operation of bending the mobile terminal 100. The controller may perform a third step S30 of operating in a second mode when the controller detects the change in the state of the mobile terminal 100. The second mode may be, for example, a second state in which the mobile terminal 100 is bent or folded.

Referring to FIG. 21(a), the user may hold the mobile terminal 100.

Referring to FIG. 21(b), a user holding the mobile terminal 100 with the first and second hands H1 and H2 can bend the mobile terminal 100 by applying a force.

Referring to FIG. 22(a), an image may be displayed on the display 151. The image may include a main image IM and a sub-image ME. The main image IM may be a content to be viewed by the user, and the sub-image ME may be information related to the main image IM. For example, the sub-image ME may include channel information, a description of the content, buttons for performing operations on the content, and the like.

Referring to FIG. 22(b), when the mobile terminal 100 is bent, the controller 180 can change the display of the image displayed on the display 151. For example, the sub-image ME can be removed and only the main image IM can be displayed. That is, the main image IM can be displayed on the full screen.

If the mobile terminal 100 is bent and has a certain curvature, the degree of immersion into the image can be increased. It is possible to display the main image IM on the full screen without additional manipulation such as changing to the full screen.

Referring to FIG. 23(a), the user repeatedly can hold the mobile terminal 100 with the first and second hands H1 and H2, and can repeatedly manipulate the mobile terminal 100 from the flat state to the bent state or vice versa.

Referring to FIG. 23(b), the controller 180 that has obtained the repeated bending operation of the user can change the state of the object displayed on the display 151 to correspond to the state of the mobile terminal 100. For example, the magnification/reduction of the image displayed on the display 151 or the playback speed of the image may vary based on at least one of the strength and speed of the bending operation. At least one of the moving speed and the distance of the object O can be made different based on at least one of the strength and the speed of the bending operation. For example, when the object O is the shape of a person running, the moving speed of the object O can be changed corresponding to the speed of the bending operation or corresponding to a curvature of the mobile terminal 100.

Figure 24:
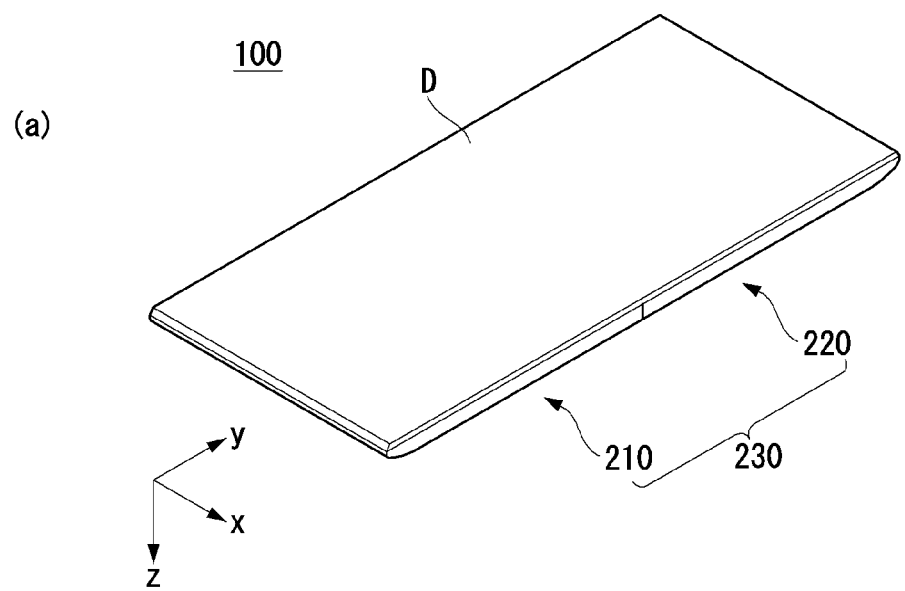
FIGS. 24 to 26 are views showing a mobile terminal according to an embodiment of the present invention.
Figure 24:
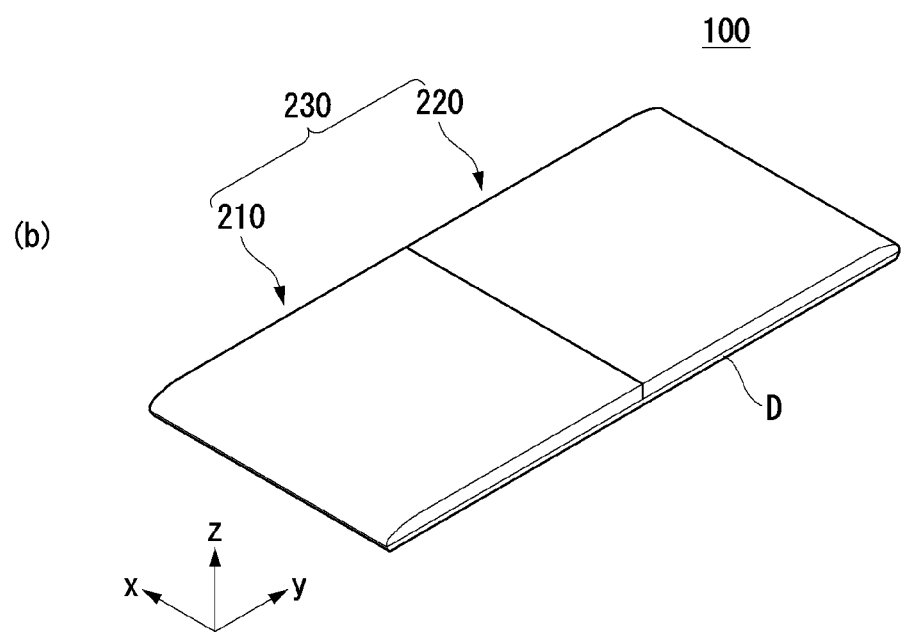
Figure 25:
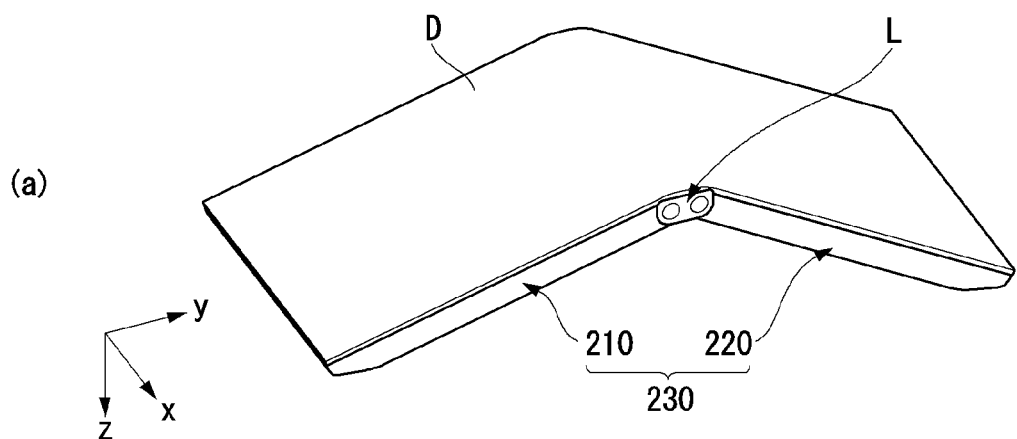
Figure 25:
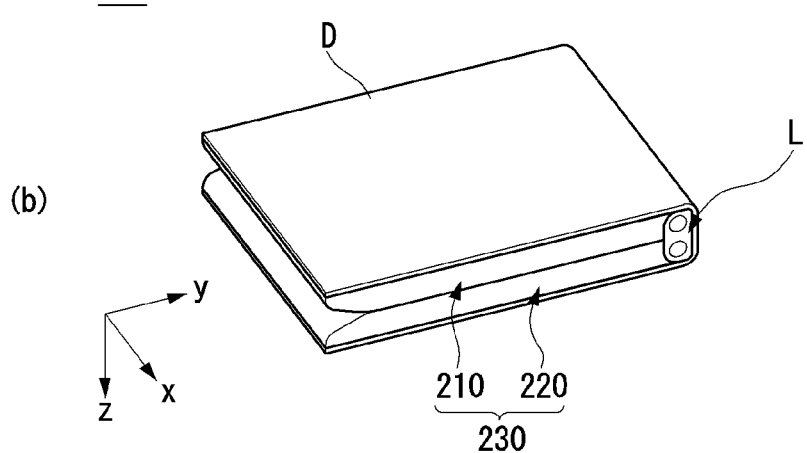
Figure 26:
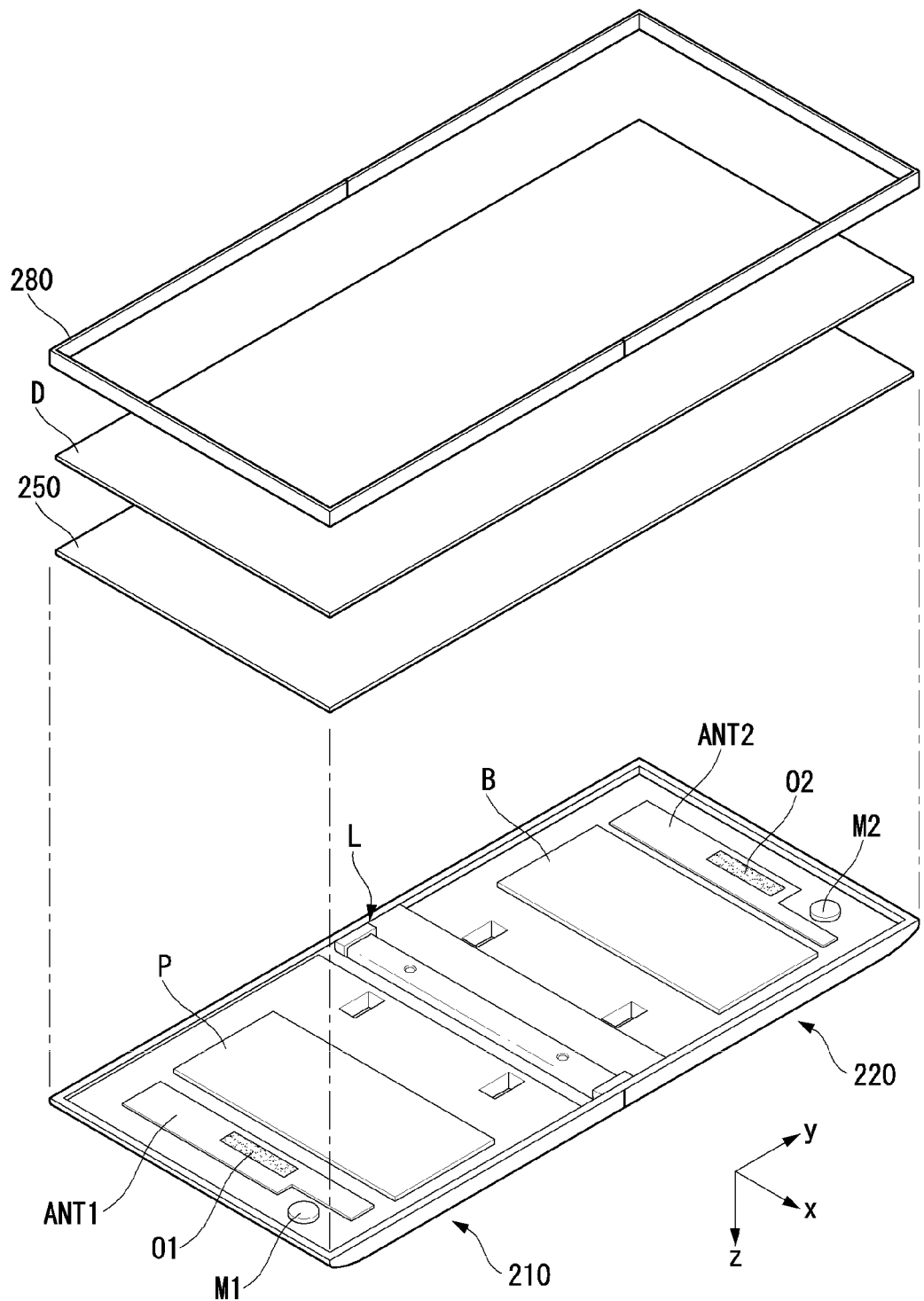

FIGS. 24 to 26 are views showing a mobile terminal according to an embodiment of the present invention.

The mobile terminal 100 may be in any of the first state and the second state and/or the intermediate of the first and second states.

FIG. 24 shows front and rear views when the mobile terminal 100 according to the embodiment of the present invention is in the first state. The body 230 of the mobile terminal 100 may include a first body 210 and a second body 220. The display D may be located on the first and second bodies 210 and 220.

FIG. 25(a) illustrates a situation in which the mobile terminal 100 according to an embodiment of the present invention is in the intermediate state between the first and second states. Referring to FIG. 25(a), the first and second bodies 210 and 220 of the mobile terminal 100 may be in a third state bent at a certain angle. The change from the first state to the second state and/or the fixation to the third state may be conducted via the hinge assembly L connecting the first and second bodies 210, 220.

FIG. 25(b) illustrates a situation in which the mobile terminal 100 according to the embodiment of the present invention is in the second state. The mobile terminal 100 may be in a second state in which the first and second bodies 210 and 220 have been rotated about the hinge assembly L. In the second state, the first and second bodies 210 and 220 may be in a superposed state. In the second state, the display D may be located in the outer region of the first and second bodies 210, 220. The display D may be configured to surround the first and second bodies 210 and 220.

FIG. 26 shows the position of the hinge assembly L included in the mobile terminal 100 according to an embodiment of the present invention. The hinge assembly L may be positioned between the first and second bodies 210 and 220.

In the mobile terminal 100, a plurality of antennas ANT1 and ANT2 can be located. A plurality of antennas ANT1 and ANT2 may be provided at different positions of the body 230. For example, the first antenna ANT1 may be located in the first body 210, and the second antenna ANT2 may be located in the second body 220. The first and second antennas ANT1 and ANT2 may be positioned at the ends of the first and second bodies 210 and 220, respectively.

The substrate P may be positioned inside the mobile terminal 100. The substrate P may be positioned on any one of the first and second bodies 210 and 220. For example, the substrate P may be located on the first body 210.

The battery B may be located inside the mobile terminal 100. The battery B may be located in one of the first and second bodies 210 and 220. The battery B may be located in a body 220 other than the body 210 where the substrate P is located. For example, the battery B may be located in the second body 220.

A plurality of sound output units O1 and O2 and/or a plurality of microphones M1 and M2 may be disposed in the mobile terminal 100. For example, the plurality of sound output units O1 and O2 and/or the plurality of microphones M1 and M2 may be disposed in an end region and another end region of the first and second bodies 210 and 220.

The hinge assembly L may be positioned inside the mobile terminal 100. The hinge assembly L may connect the first and second bodies 210 and 220. The hinge assembly L may be located between the first and second bodies 210 and 220.

The frame 250 may be positioned on the first and second bodies 210 and 220. The frame 250 may cover the upper surfaces of the first and second bodies 210 and 220. The frame 250 may cover the structures inside the mobile terminal 100. The frame 250 may make the front surface of the mobile terminal 100 flat.

The display D may be positioned on the frame 250. The frame may prevent the display D from being cracked or damaged.

The front cover 280 may cover the lateral sides of the first and second bodies 210 and 220. The front cover 280 can guide the position of the frame 250 and the display D. The front cover 280 may be in the form of a photo-frame having an empty central portion. The front cover 280 can be divided with respect to the central portion so that the first and second bodies 210 and 220 are not damaged even when bent at a certain angle. A portion of the front cover 280 may cover the lateral surface of the first body 210 and the other portion of the front cover 280 may cover the lateral surface of the second body 220.

Figure 27:
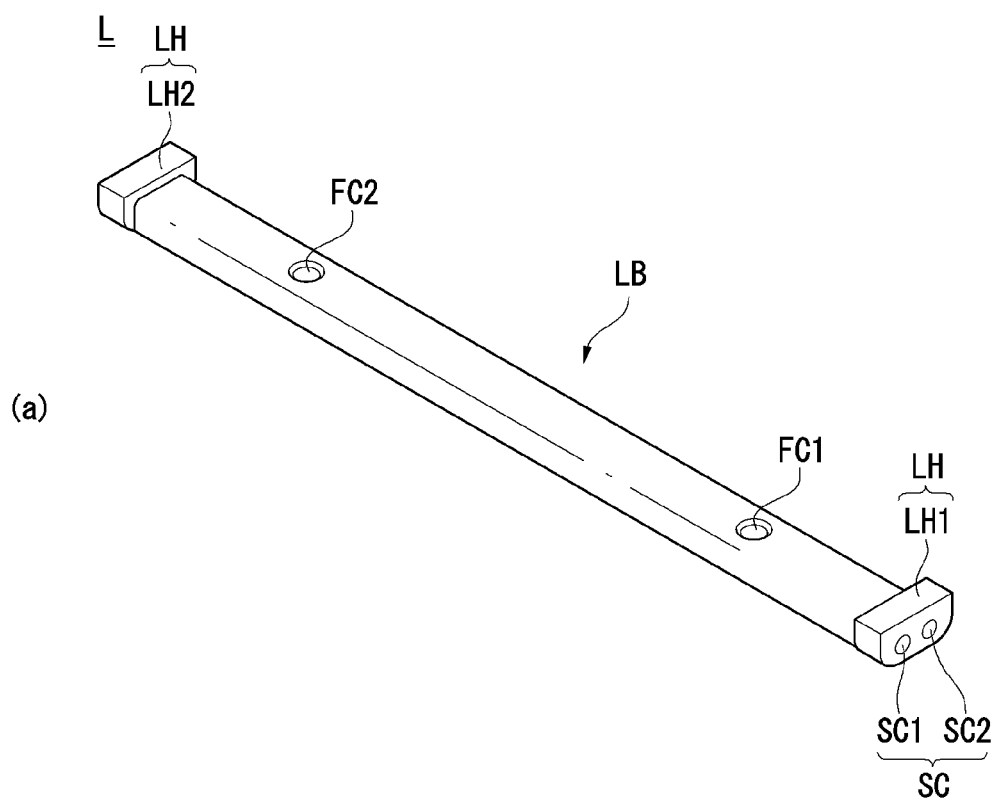
FIG. 27 is a view showing the hinge assembly L of FIG. 26.
Figure 27:
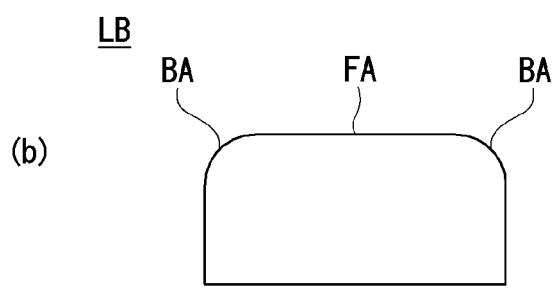

FIG. 27 is a view showing the hinge assembly L of FIG. 26.

The hinge assembly L may include a hinge head LH, a hinge body LB, and a coupling shaft SC.

The hinge head LH may include a first hinge head LH1 and a second hinge head LH2 located at both ends of the hinge assembly L. The first hinge head LH1 may be located at an end of the hinge assembly L and the second hinge head LH2 may be located at another end of the hinge assembly L. The hinge head LH may be a portion exposed to the outside of the mobile terminal. The hinge head LH may have a rectangular shape. However, the present invention is not limited thereto, and the hinge head LH may have a curved shape.

The hinge body LB may be the body of the hinge assembly L. The hinge body LB can be located at the center of the hinge assembly L. The hinge body LB may be connected to the first and second hinge head LH located at both ends.

Referring to FIG. 27(b), the upper surface of the hinge body LB may include a bent area BA and a flat area FA.

The bent area BA may be located at both ends of the hinge body LB. The bent area BA may be in contact with the frame 250 in the second state and spaced apart from the frame 250 in the first state.

The flat area FA may be a flat portion. The flat area FA may be located at the center of the hinge body LB. The flat area FA may be connected to the bent areas BA located at both ends. The flat area FA may always be in contact with the frame 250. The flat area FA may be in contact with the frame 250 through the first and second holes FC1 and FC2.

Figure 28:
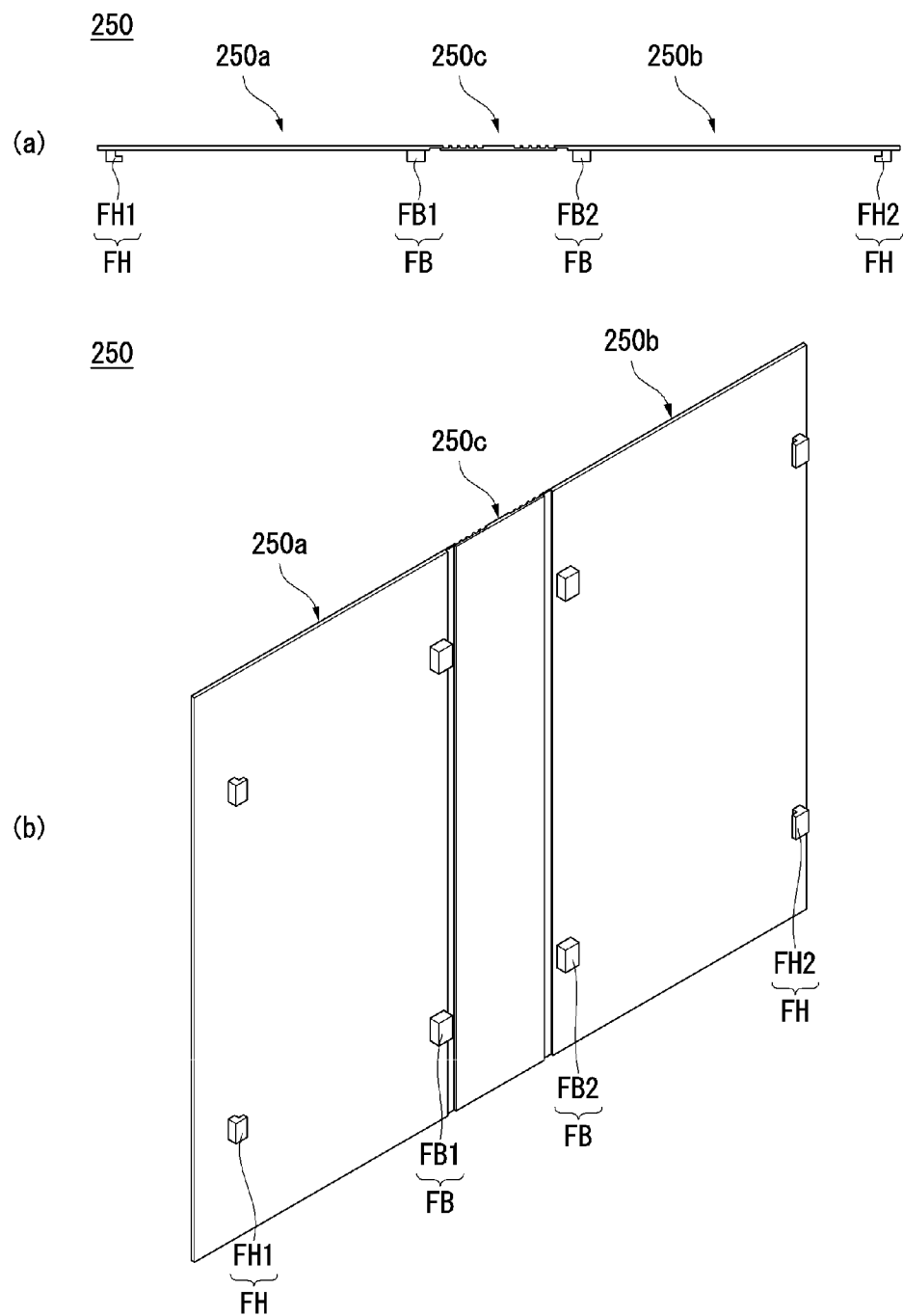
FIG. 28 is a diagram showing a frame 250 of FIG. 26.

FIG. 28 is a diagram showing a frame 250 of FIG. 26.

The frame 250 may include first to third frames 250a, 250b, and 250c. The frame 250 can be divided into three parts.

The first and second frames 250a may be positioned on both sides of the frame 250. The first and second frames 250a and 250b may include a hook FH and a bump FB on a lower surface thereof. The first and second frames 250a and 250b may be combined with other structures using the hooks FH and the bumps FB. The first and second frames 250a and 250b may be symmetrical with reference to the third frame 250c.

The third frame 250c may be located at the center of the frame 250. The third frame 250c may be at least partially in contact with the first and second frames 250a and 250b. The upper surfaces on both sides of the third frame 250c can be in contact with the lower surfaces of the end portions of the first and second frames 250a and 250b. The overlapped area of the third frame 250c with the first and second frames 250a and 250b may vary depending on the extent to which the frame 250c is bent. Accordingly, the frame 250 can move freely even when bent.

Figure 29:
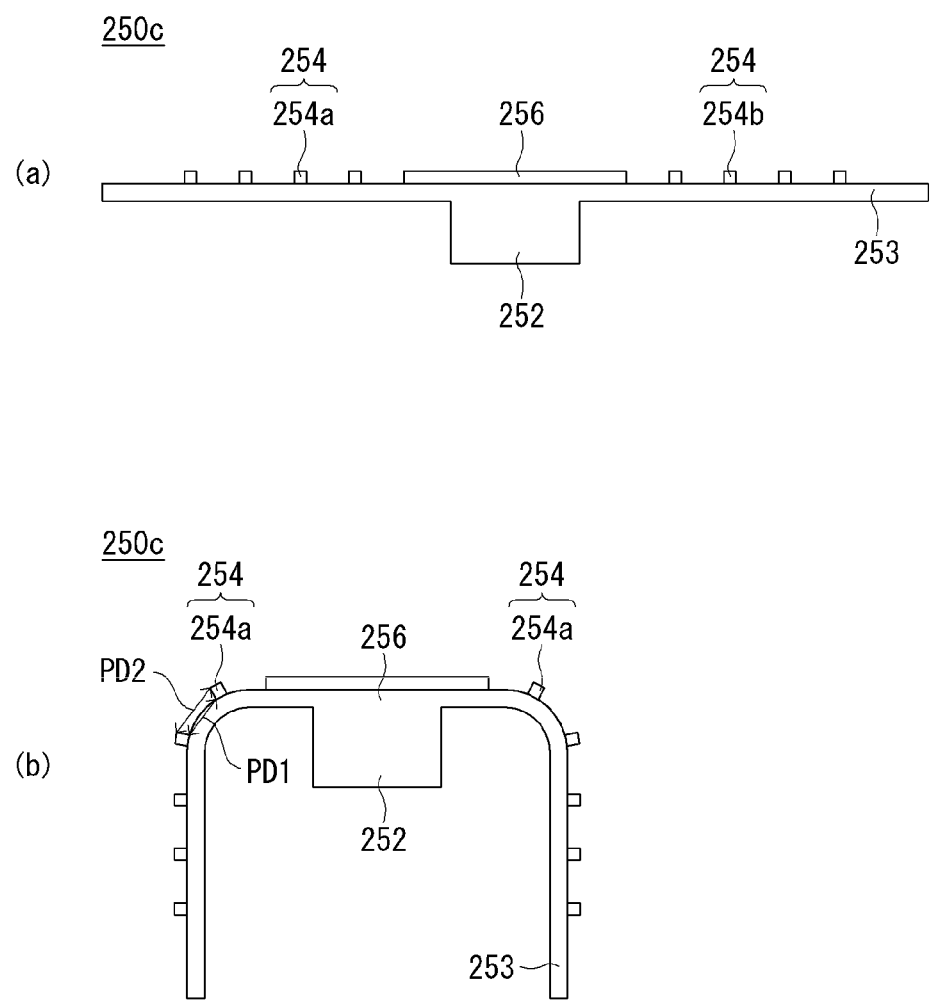
FIG. 29 is a view showing the third frame of FIG. 28.

FIG. 29 is a view showing the third frame 250c of FIG. 28.

The third frame 250c may include a coupling portion 252, a frame body 253, a protrusion 254, and a contact portion 256.

The frame body 253 may be the body of the third frame 250c. The frame body 253 may be a portion from which the coupling portion 252, the protrusion 254, and the contact portion 256 extend.

The coupling portion 252 can protrude downward from the center portion of the frame body 253. The coupling portion 252 may be a portion at which the hinge assembly L and the third frame 250c are coupled. The coupling portion 252 can be engaged with the hinge assembly L using a screw. However, the present invention is not limited thereto, and the coupling portion 252 may be coupled to the hinge assembly L using an adhesive.

The protrusions 254 may include first and second protrusions 254a and 254b positioned on both sides of the frame body 253. For example, the first protrusion 254a may be located on a side of the frame body 253, and the second protrusion 254b may be located on another side of the frame body 253.

The protrusions 254 may be composed of a plurality of protrusions and may be spaced apart from each other. The protrusions 254 may be spaced apart from each other in the first state. In the second state, the spacing PD1 of the lower portion of the protrusion 254 may be different from the spacing PD2 of the upper portion of the protrusion 254. For example, in the second state, the spacing PD2 of the upper portion of the protrusion 254 may be greater than the spacing PD1 of the lower portion of the protrusion 254.

Since the protrusions 254 are spaced apart from each other on the frame body 253, the difference in length between the inner side surface and the outer side surface resulting from the process of bending the frame body 253 from the first state to the second state can be compensated. Cracks or damage on the upper portion of the protrusion 254 can be prevented, since the spacing PD1 between the lower portion of the protrusion 254 in the second state is different from the spacing PD2 between the upper portion of the protrusion 254. The protrusion 254 may include a highelasticity material because it must compensate for the shape change. For example, the protrusion 254 may comprise acrylic or PC material.

The contact portion 256 may be located at the upper center portion of the frame body 253. The contact portion 256 may be opposite to the coupling portion 252 with respect to the frame body 253. The contact portion 256 may be a portion corresponding to the flat area FA of the hinge assembly L. The shape of the contact portion 256 may not change even in the second state.

Figure 30:
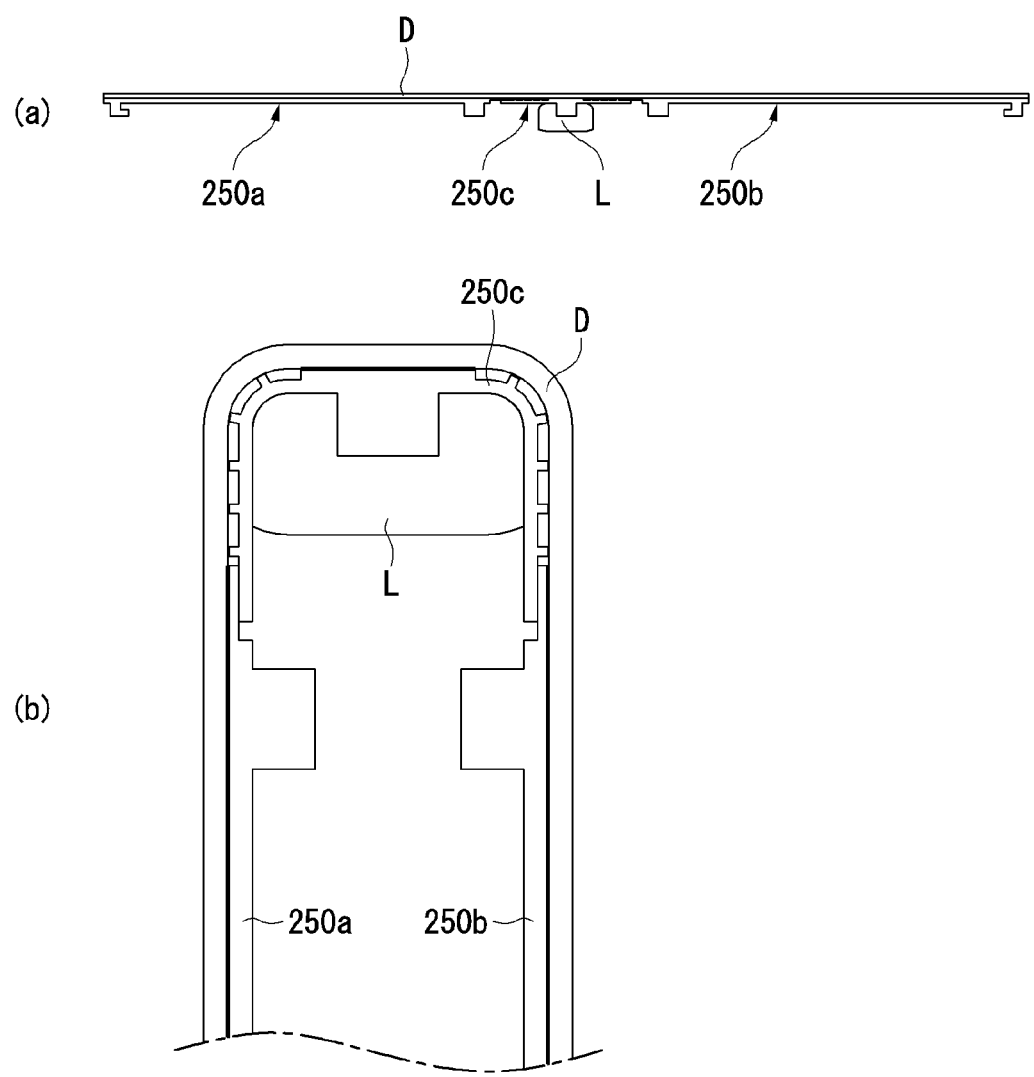
FIG. 30 is a view showing a contact between the frame and the display.

FIG. 30 is a view showing a contact between the frame 250 and the display D.

The display D may be attached to the frame 250. A portion of the display D except for the area where the display D is bent may be attached to the frame 250. The display D may not be easily separated from the frame 250. Another portion of the display D which is bendable may be not attached to the frame 250. It is possible to prevent the display D from being cracked or broken due to an increase in the length of the outer surface when the display D is bent.

In this figure, the display D is shown to be all attached except for the bendable region. The display D may be attached to the first and second frames 250a and 250b and separated from the third frame 250c. In this case, the display D can move more freely when bent.

Figure 31:
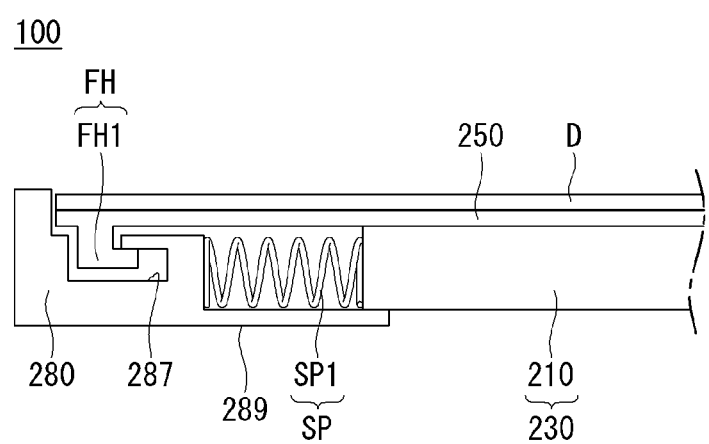
FIGS. 31 and 32 are views showing a configuration of the mobile terminal according to an embodiment of the present invention.
Figure 32:
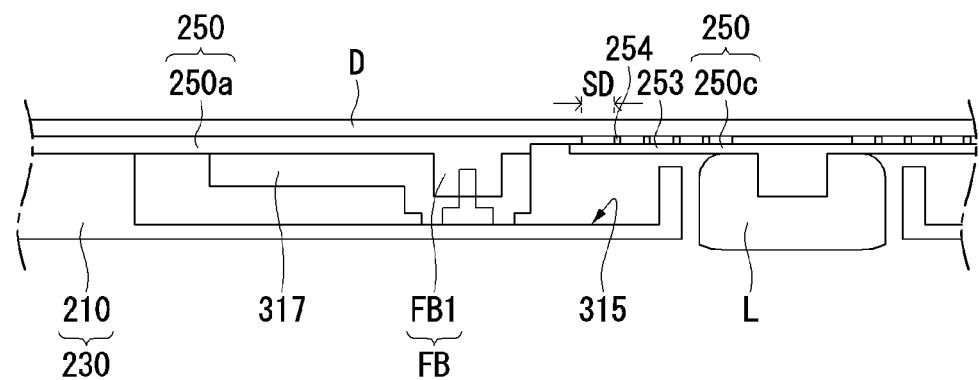

FIGS. 31 and 32 are views showing the configuration of a mobile terminal according to an embodiment of the present invention.

FIG. 31 shows an edge portion of the mobile terminal 100 according to an embodiment of the present invention. The frame 250 can be coupled to the front cover 280 via the hook FH. The hooks FH can be coupled to a recess 287 formed at the front cover 280. The front cover 280 may guide the frame 250. The display D may be coupled to the front cover 280, as the frame 250 is coupled to the front cover 280. Accordingly, the display D may be not separated from the body 230.

The spring SP may be positioned between the front cover 280 and the body 230. The spring SP can operate between the front cover 280 and the body 230. For example, the spring SP may adjust the gap between the front cover 280 and the body 230 according to the state of the mobile terminal 100. An end of the spring SP may be connected to the inner side surface of the front cover 280 and another end of the spring SP may be connected to the outer side surface of the body 230.

The front cover 280 may include an extension portion 289 extending from the lower side of the front cover 280 toward the body 230. The extension portion 289 may be longer than the maximum length of the spring SP. Accordingly, the spring SP may be not exposed to the outside. The extension portion 289 can contact the lower surface of the body 230. The extension portion 289 can slide relative to the body 230. The extension portion 289 can move smoothly.

FIG. 32 shows a central part of the mobile terminal 100 according to an embodiment of the present invention. The body 230 may include a slide groove 315 adjacent to the center of the mobile terminal 100. The slide groove 315 may be a portion at which frame 250 slides with respect to the body 230. The slide groove 315 may be inwardly recessed from the front surface of the body 230.

The bumps FB of the frame 250 can be inserted into the slide grooves 315. The bump FB can be coupled to the slide pad 317. The slide pad 317 can be coupled with the bump FB by a screw. The slide pad 317 slides on the body 230 and friction may occur. The slide pad 317 may include a material with low frictional force. For example, the slide pad 317 may comprise a POM material.

The end of the upper surface of the first frame 250a may overlap with the third frame 250c. At least a portion of the first frame 250a may be positioned on the upper surface of the frame body 253 of the third frame 250c. The end of the first frame 250a may be spaced apart from the protrusion 254 of the third frame 250c as much as a certain spacing SD. In this case, the first frame 250a can freely move due to the spacing SD between the end of the first frame 250a and the protrusion 254 of the third frame 250c. When the mobile terminal 100 is bent, the end of the first frame 250a moves on the third frame 250c, and the difference in length between the outer side and the inner side can be compensated.

Figure 33:
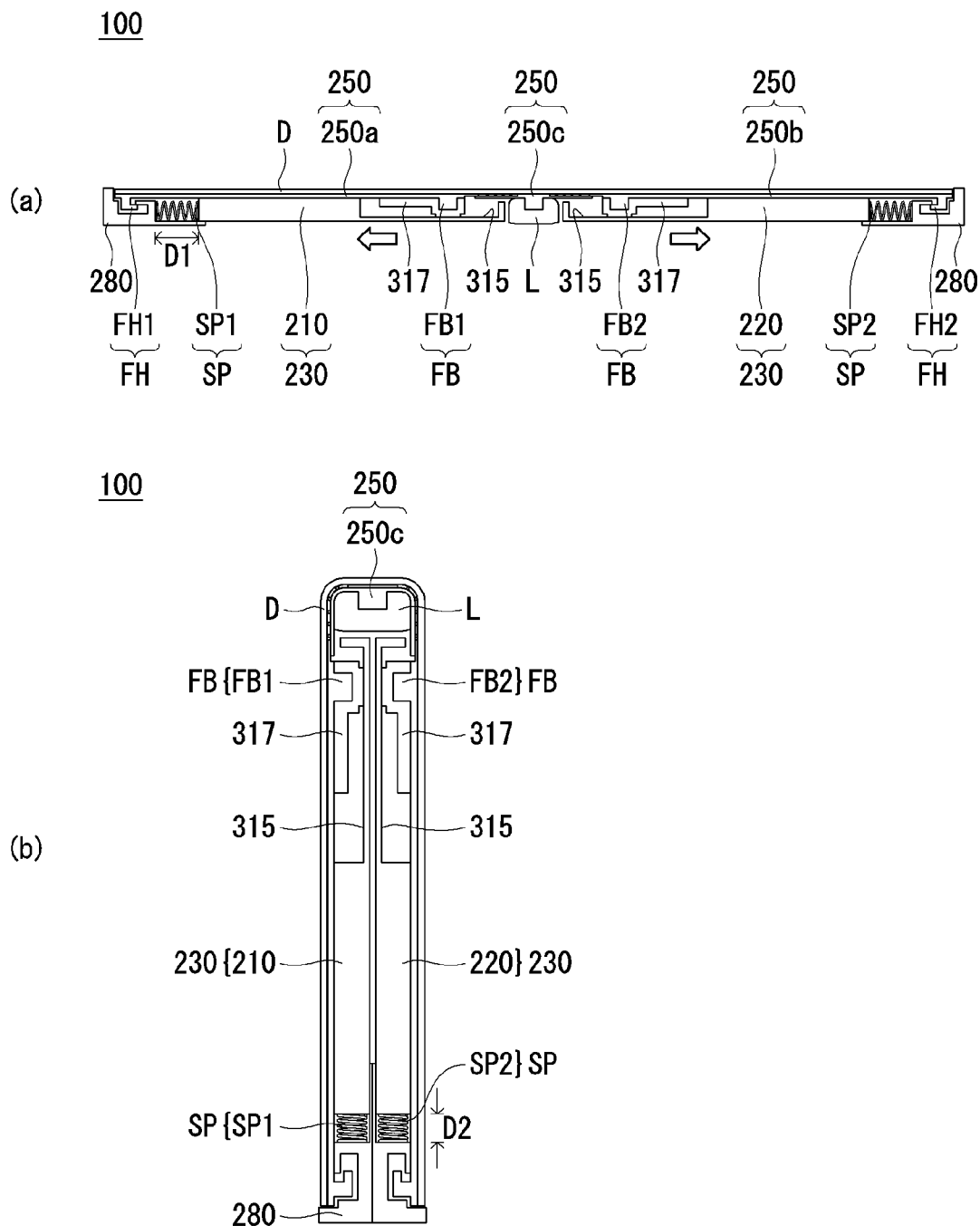
FIG. 33 is a view showing an operation of the mobile terminal according to an embodiment of the present invention.

FIG. 33 is a diagram illustrating an operation of a mobile terminal according to an embodiment of the present invention.

When the body 230 is changed from the first state to the second state, it may be necessary to compensate for the difference in length between the inner side surface and the outer side surface of the body 230 while bending the body 230. Accordingly, the length of the inner side surface of the body 230 can be shortened. In detail, an external force may be applied so that the body 230 is bent and the spring SP is compressed. When the spring SP is compressed, the body 230 can be inserted into the front cover 280.

Referring to FIG. 33(a), in the first state, the spring SP may have a first length D1. Accordingly, most of the body 230 can be exposed to the outside of the front cover 280.

Referring to FIG. 33(b), in the second state, the spring SP may have a second length D2. The second length D2 may be less than the first length D1. In the second state, a part of the body 230 is inserted into the front cover 280, so that the length of the body 230 exposed to the outside of the body 230 can be shortened. A portion where the body 230 and the front cover 280 are overlapped with each other may be longer. The length in the Y direction of the body 230 and the front cover 280 in the second state may be shorter than the length in the Y direction of the body 230 and the front cover 280 in the first state.

As the body 230 moves relative to the frame 250, the bumps FB of the frame 250 can slide in the slide grooves 315. Referring to FIG. 33(a), the slide pad 317 may be positioned adjacent to an end of the slide groove 315 in the first state. Referring to FIG. 33(b), the slide pad 317 may be positioned adjacent to another end of the slide groove 315 in the second state.

When the mobile terminal 100 changes from the first state to the second state, a part of the body 230 can be inserted into the front cover 280. Accordingly, the length of the inner side of the mobile terminal 100 is reduced, and the difference in length between the inner side and the outer side of the mobile terminal 100 can be compensated.

Figure 34:
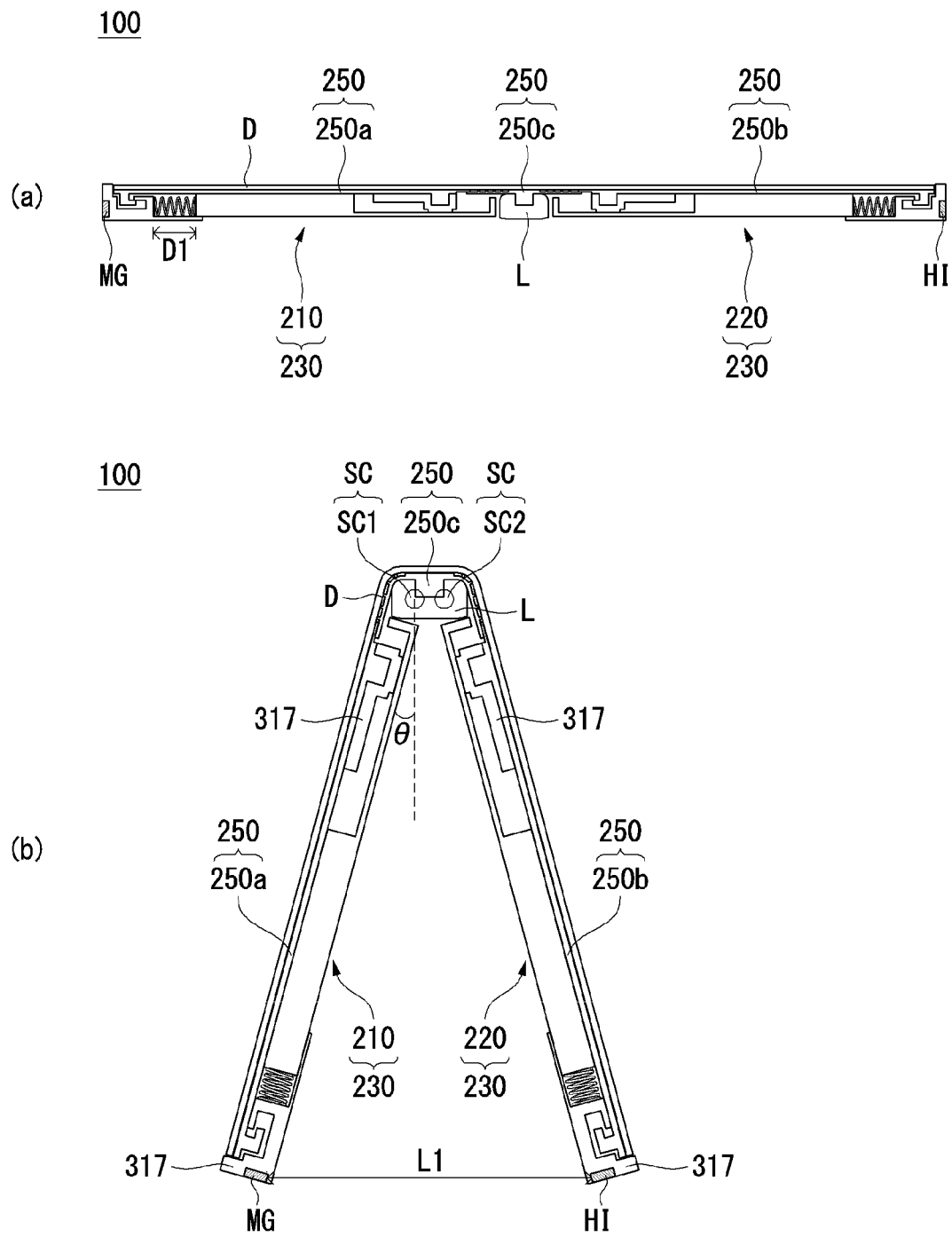
FIGS. 34 and 35 are views showing a mobile terminal according an embodiment of the present invention.
Figure 35:
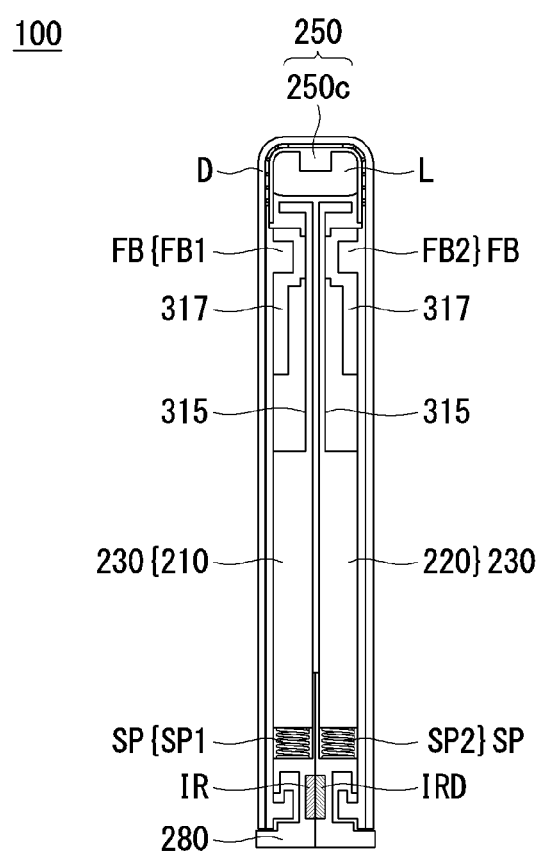

FIG. 34 and FIG. 35 are views showing a mobile terminal according to an embodiment of the present invention.

Referring to FIG. 34, a magnet MG and a hall sensor HI may be positioned on both-end front cover 280 of the mobile terminal 100 in the longitudinal direction. The magnet MG and the Hall sensor HI can be opposite to each other with respect to the center of the mobile terminal 100. In the second state, the magnet MG and the hall sensor HI can face each other. The hall sensor HI can sense and react with the magnetic field of the magnet MG. The hall sensor HI can sense the magnetic field originated from the magnet MG when the first body 210 and the second body 220 are in the second state. The controller of the mobile terminal 100 may deactivate the display D when the Hall sensor HI senses the magnetic field of the magnet MG.

In case that the magnet MG and the hall sensor HI are located at the outermost portion of the mobile terminal 100, when the angle between the first body 210 and the second body 220 is smaller than a certain angle, the hall sensor HI can sense the magnetic field of the magnet MG. Based on the relation of the distance L between the magnet MG and the hall sensor HI to the angle θ formed by the body 230 with respect to the fixed axis SC, the controller may determine whether to activate the display D.

Referring to FIG. 35, an infrared component IR and an infrared sensor IRD may be disposed at the lower portions of the first body 210 and the second body 220. The infrared component IR and the infrared sensor IRD may face each other in the second state.

An infrared sensor IRD can sense infrared rays emitted from the infrared component IR. The controller of the mobile terminal 100 may deactivate the display D when the infrared sensor IRD senses the infrared ray.

In this figure, the infrared component IR and the infrared sensor IRD are positioned on the lower surfaces of the first and second bodies 210 and 220. The infrared component IR and the infrared ray sensor IRD may be positioned on the lower surface of the front case 280.

FIGS. 36 to 43 illustrate operations of a mobile terminal according to an embodiment of the present invention.

Based on the state of the display D, at least a portion of the display D may be activated or deactivated.

Figure 36:
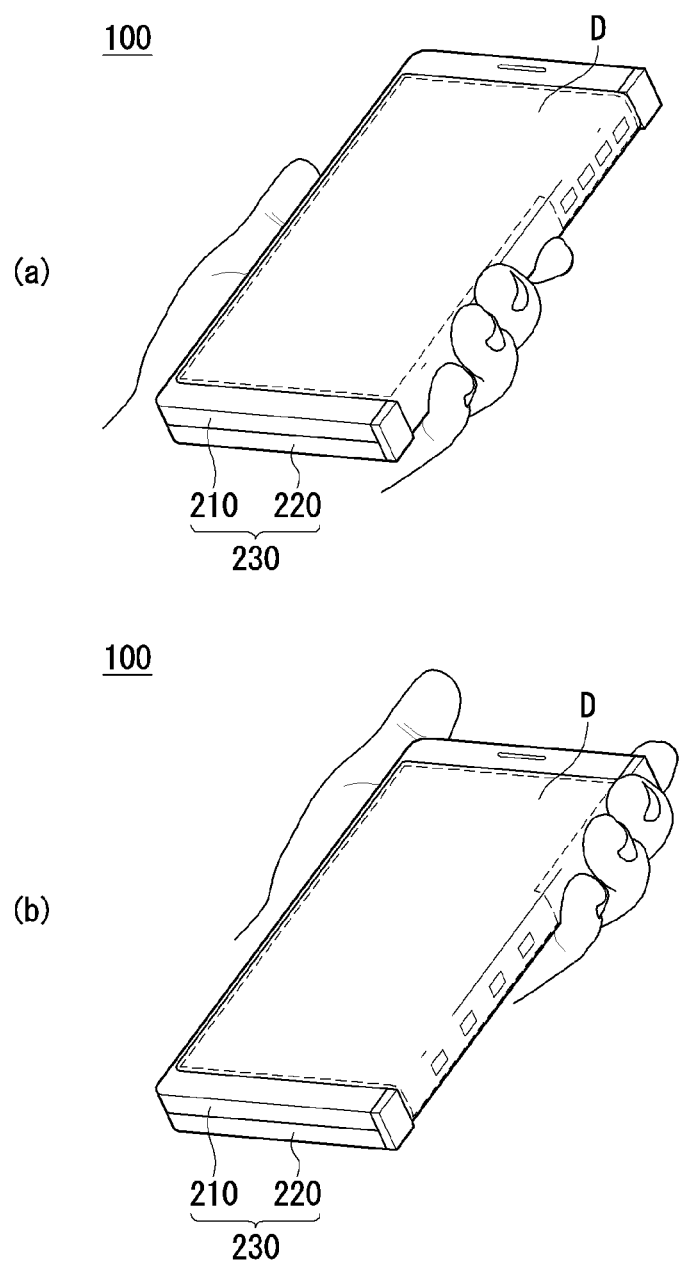
FIGS. 36 to 43 are views showing an operation of the mobile terminal according to an embodiment of the present invention.

Referring to FIG. 36, when the user grips the mobile terminal 100, the user can touch the remaining surface except the front surface. The controller of the mobile terminal 100 may recognize the touched surface or the untouched surface to deactivate the display D of the touched surface. The touched surface or the untouched surface can be recognized by using any one of the gyro sensor, the face recognition, and the infrared sensor of the mobile terminal 100. It is possible for the controller of the mobile terminal 100 to recognize the covered surface and the uncovered surface among surfaces of the display D and to deactivate the covered surface of the display D. The covered surface of the display D may mean the touched surface of the display D. The uncovered surface of the display D may mean the untouched surface of the display D.

On the other hand, the touched surface of the display D can be activated. The controller of the mobile terminal 100 may cause only the touch input to be inactivated on the touched surface of the display D. In this case, the user can enjoy a larger screen because the screen of the display D is activated in full size.

The display D located on the lateral side of the mobile terminal 100 can be divided into upper and lower areas. Referring to FIG. 36(a), when the user touches the lower area of the lateral side of the display D, the controller of the mobile terminal 100 may activate touch input of the display D at the upper area of the lateral side. Referring to FIG. 36(b), when the user touches the upper area of the lateral side of the display D, the controller of the mobile terminal 100 may activate touch input of the display D at the lower area of the lateral side.

Figure 37:
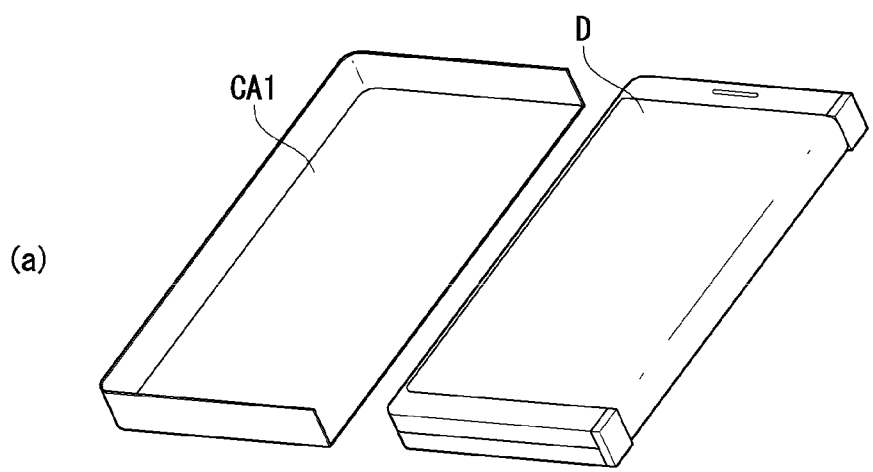
Figure 37:
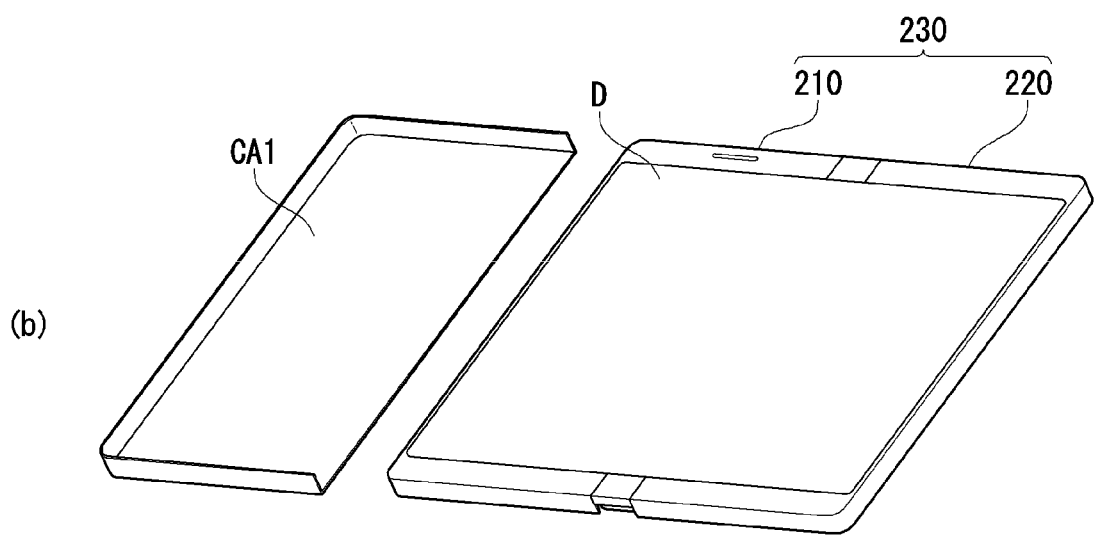

Referring to FIG. 37, the mobile terminal 100 may be in the first state or the second state. The mobile terminal 100 may be at least partially covered by the first case CA1.

Referring to FIG. 37(a), in the second state, the first case CA1 may be slidably coupled to any one of the first and second bodies 210 and 220. For example, the first case CA1 may be slidably coupled to the second body 220. The first case CA1 can slide on the second body 220 to cover the display D disposed on the second body 220. In this case, the controller of the mobile terminal 100 can activate only the display D disposed on the first body 230 and lateral side.

Referring to FIG. 37(b), in the first state, the first case CA1 may be slidably coupled to any one of the first and second bodies 210 and 220. In this case, the first case CA1 may not shield the display D. Accordingly the controller of the mobile terminal 100 can activate all of the display D.

Figure 38:
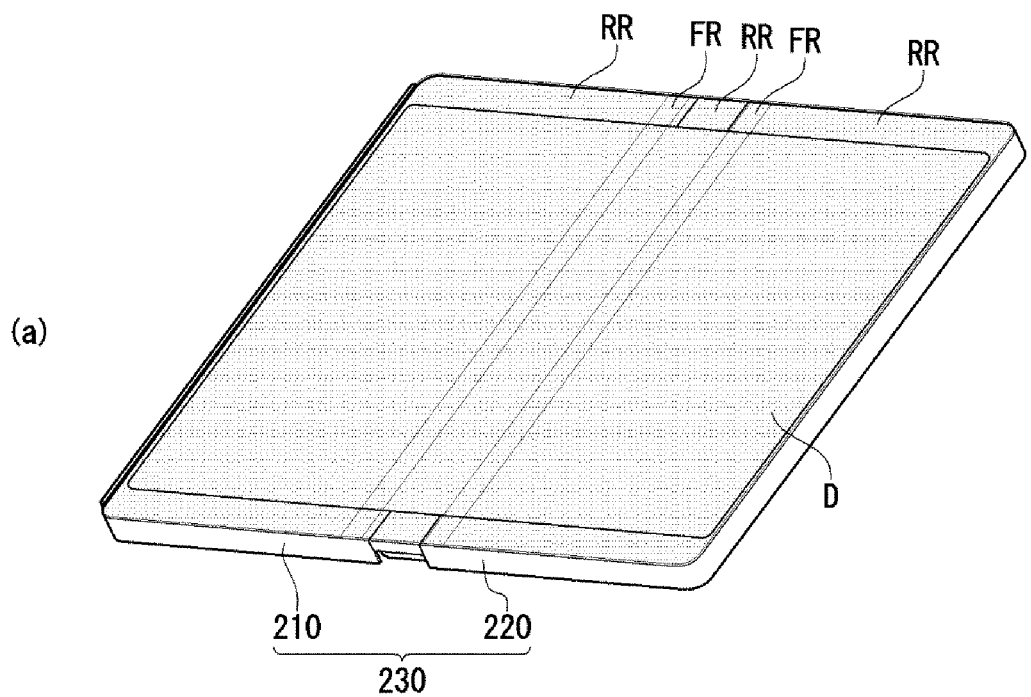
Figure 38:
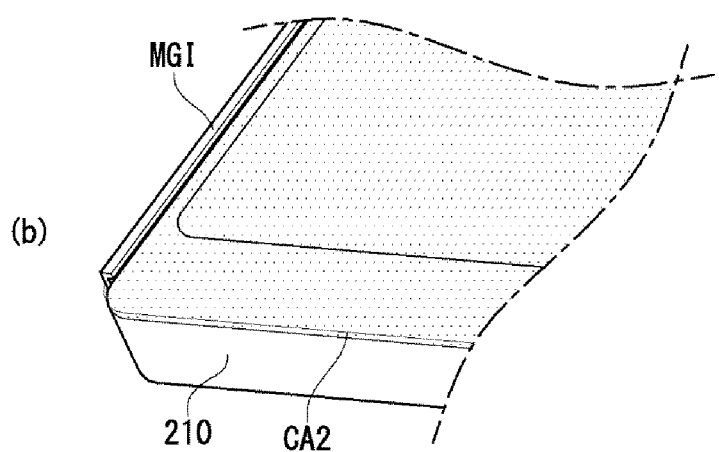

Referring to FIG. 38, in the first state, the second case CA2 may cover the upper surface of the display D. The controller of the mobile terminal 100 may deactivate the entire display D. The second case CA2 may be guided by a magnet guide MGI located on the upper side of the first body 210. A side of the second case CA2 can be fitted in the magnet guide MGI. Accordingly, the second case CA2 can be aligned on the body 230.

The second case CA2 may be composed of a flexible region FR and a rigid region RR. The flexible region FR is a portion corresponding to the bent area BA of the hinge assembly L and the rigid region RR may be a portion corresponding to the flat area FA of the hinge assembly L. The shape of the flexible region FR may change as the state of the bodies 230 vary from the first state to the second state or vice versa. Accordingly, the flexible region FR can include a material having a ductility higher than that of the rigid region RR.

In this figure, a magnet guide MGI and a second case CA2 are seen to be positioned on the upper side of the body 230. However, the magnet guide MGI and the second case CA2 may be positioned below the body 230.

Figure 39:
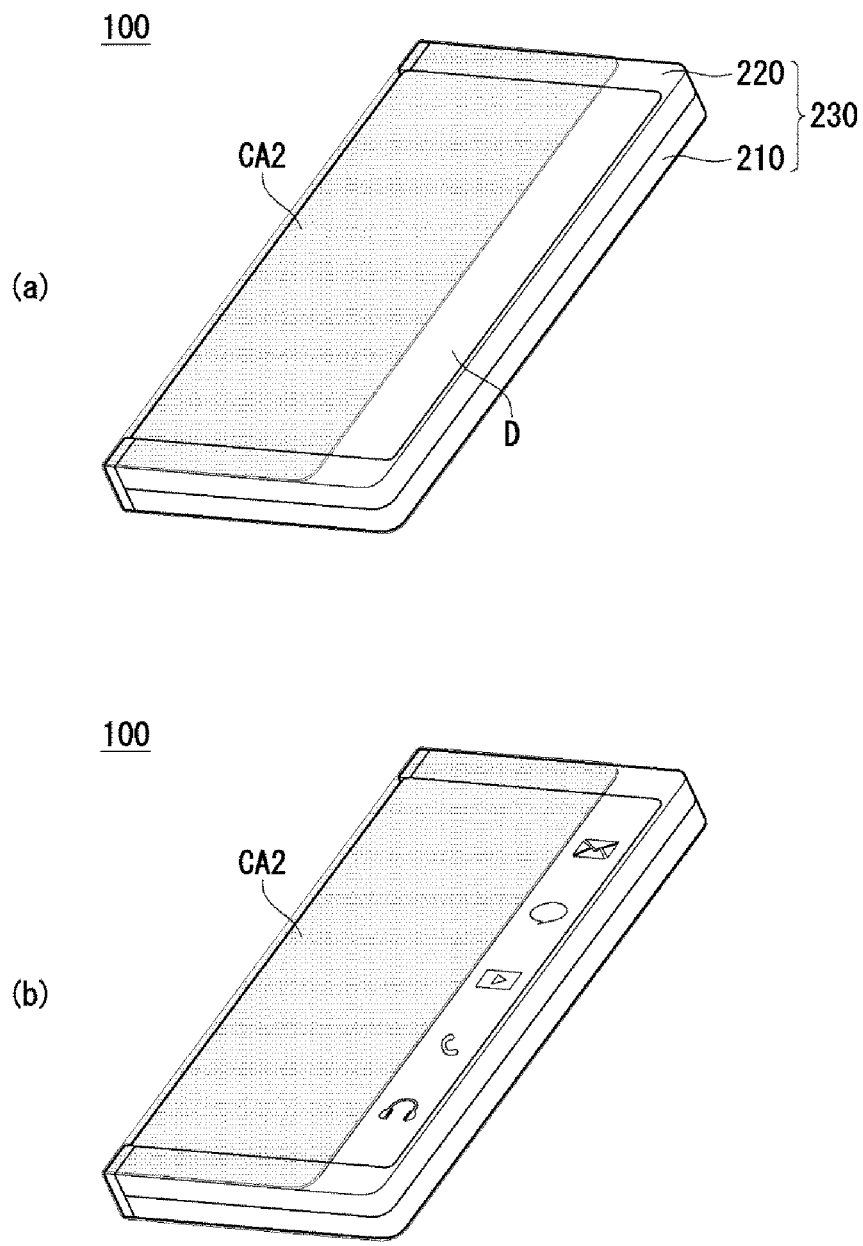

Referring to FIG. 39, in the second state, the second case CA2 can cover a portion of the display D due to the difference in length between the outer side surface and the inner side surface of the body 230. Accordingly, the display D can be partially exposed to the outside. The controller of the mobile terminal 100 may activate the exposed portion of the display D. For example, the controller of the mobile terminal 100 may cause a notification, a text confirmation, or a phone call icon to be displayed on the exposed portion of the display D. Accordingly the user can use various functions even if the mobile terminal 100 is covered by the second case CA2.

Figure 40:
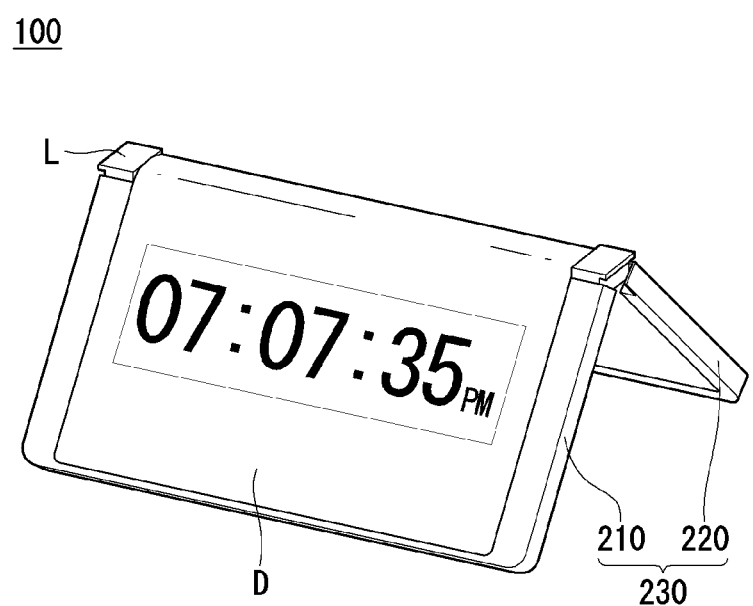

Referring to FIG. 40, the mobile terminal 100 may be in a third state, which is an intermediate state of the first and second states. That is, the mobile terminal 100 may be in a third state in which the first and second bodies 210 and 220 are bent at a certain angle. In this case, the user can support both ends of the first and second bodies 210 and 220 on the floor surface. The controller of the mobile terminal 100 may activate the display D located on at least one of the first and second bodies 210. The user can easily confirm the contents displayed on the display D without holding the mobile terminal 100.

Figure 41:
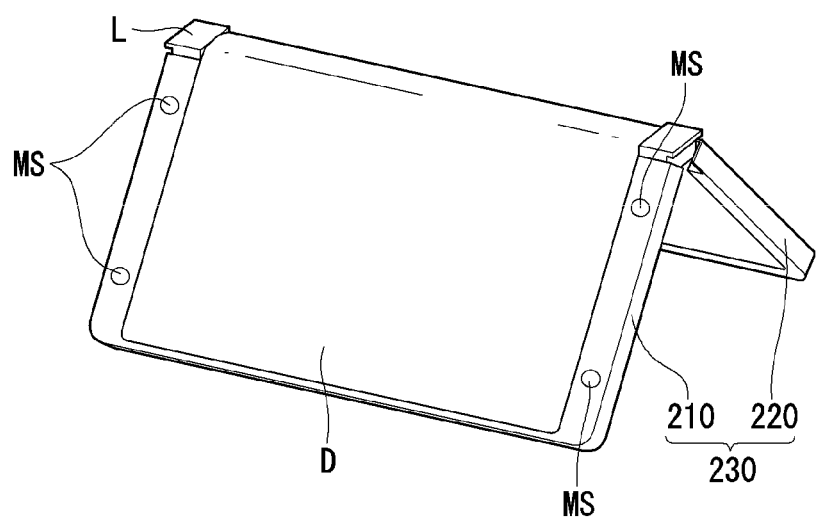

Referring to FIG. 41, the mobile terminal 100 may be in a third state, which is an intermediate state of the first and second states. That is, the mobile terminal 100 may be in a third state in which the first and second bodies 210 and 220 are bent at a certain angle. The mobile terminal 100 may be provided with a motion sensor MS on both sides of the display D. The motion detection sensor MS may be located in the first body 210 and/or the second body 220.

The motion sensor MS can detect the user's operation by using any one of a camera, an infrared sensor, and an ultrasonic sensor. When the motion sensor MS detects the motion of the user, the controller of the mobile terminal 100 may display a screen corresponding to the signal of the motion sensor MS.

The display D positioned on the first body 210 may display a screen corresponding to the signal of the motion sensor MS located on the first body 210. The display D positioned on the second body 220 may display a screen corresponding to the signal of the motion sensor MS on the second body 220. Accordingly, the users can watch the display D displaying two screens, and can play a game or the like utilizing the interactive motion recognition control.

Figure 42:
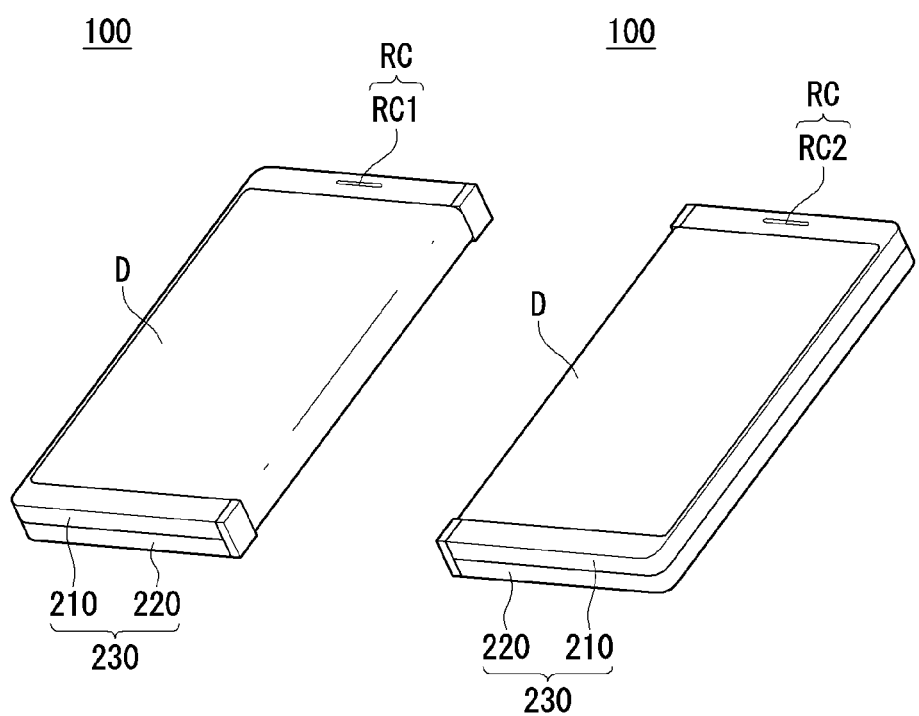

Referring to FIG. 42, both the first body 210 and the second body 220 may include a receiver RC. The mobile terminal 100 may include a first receiver RC1 located on the first body 210 and a second receiver RC2 located on the second body 220.

The controller of the mobile terminal 100 may display a second screen on the display D on the second body 220, while the mobile terminal 100 is under phone call by using the first receiver RC1, wherein a first screen is displayed on the display D on the first body 210, wherein the first screen may be different from the second screen. That is, the display D on the first body 210 and the display D on the second body 220 can perform different functions at the same time. Likewise, the controller of the mobile terminal 100 may display another screen on the display D located on the first body 210 even when receiving the telephone using the second receiver RC2.

Figure 43:
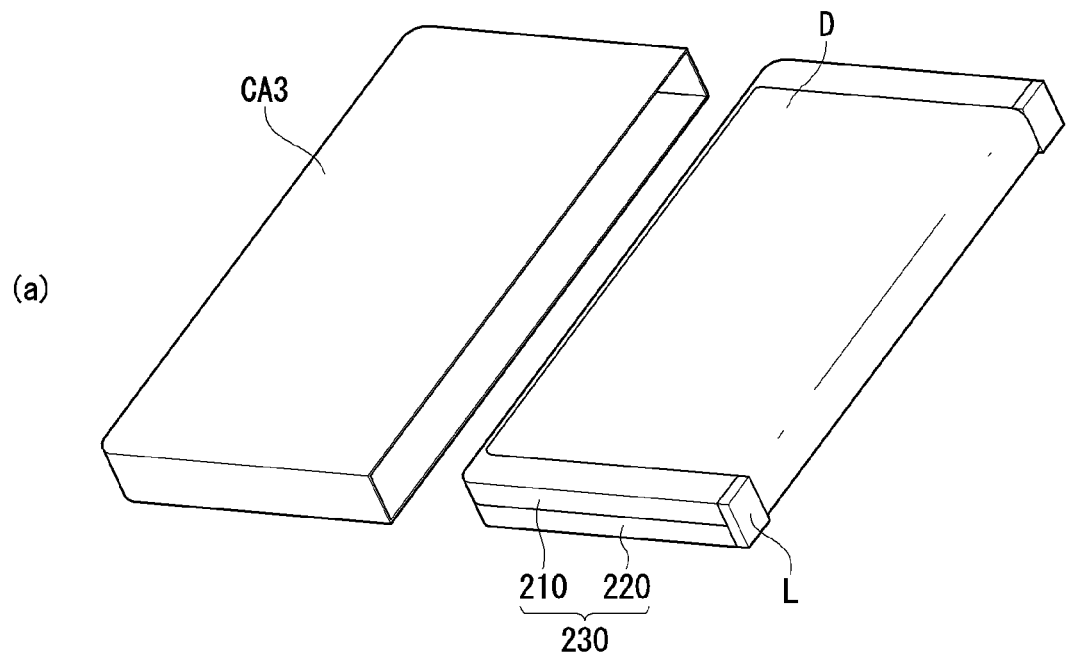
Figure 43:
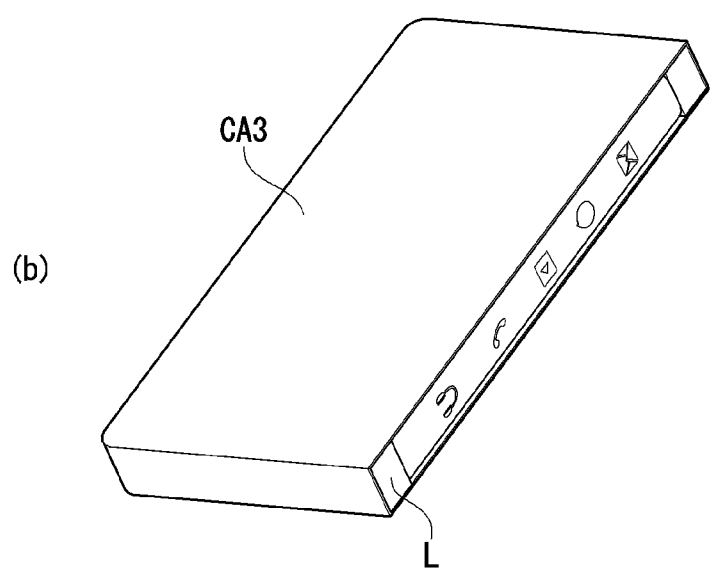

Referring to FIG. 43, the mobile terminal 100 may be at least partially covered by the third case CA 3. The third case CA3 may cover the display D located on the first and second bodies 210 and 220. Accordingly the display D placed on the hinge assembly L may not be covered by the third case CA3.

The controller of the mobile terminal 100 may activate the exposed portion of the display D. For example, the controller of the mobile terminal 100 may display a notification, text confirmation, or telephone reception icon on the exposed portion of the display D. Accordingly the user can use various functions without removing the mobile terminal 100 from the third case CA3.

Figure 44:
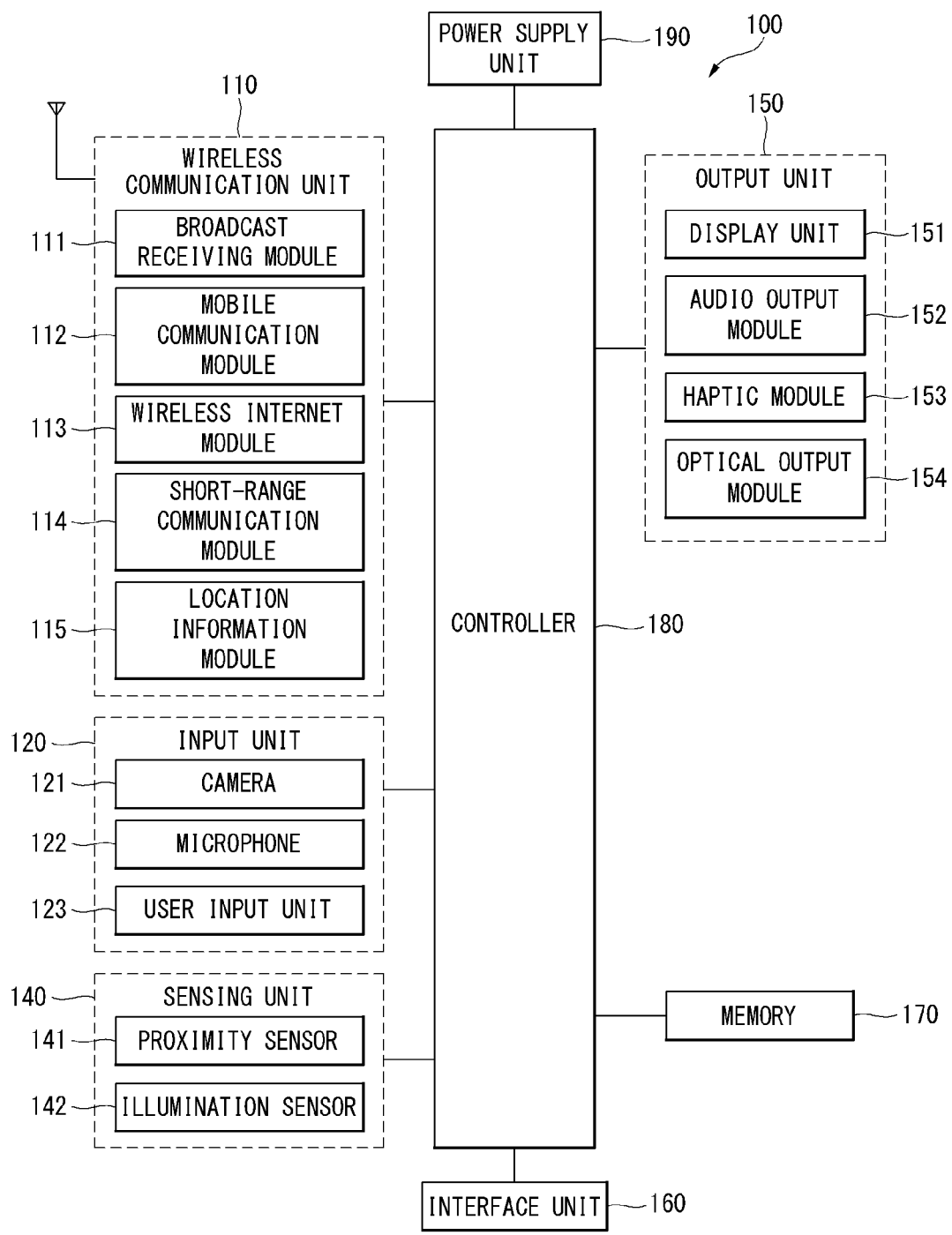
FIG. 44 is a block diagram of a mobile terminal according to an embodiment of the invention.

FIG. 44 is a block diagram of a mobile terminal according to an exemplary embodiment of the invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like.

In order to drive application programs stored in the memory 170, the controller 180 may control some or all of the components illustrated in FIG. 44. The controller may conduct a combination of at least two components included in the mobile terminal for the driving of the application program.

The power supply unit 190 can be configured to receive external power or provide internal power in order to supply appropriate power required for operating elements and components included in the mobile terminal 100. The power supply unit 190 may include a battery, and the battery may be configured to be embedded in the device body, or configured to be detachable from the device body.

At least some of the above-described components may operate in cooperation with each other to implement an operation, control, or control method of the mobile terminal according to various embodiments described below. In addition, the method of operation, control, or control of the mobile terminal may be implemented on the mobile terminal by driving at least one application program stored in the memory 170.

The present invention described above can be embodied as computer-readable codes on a medium on which a program is recorded. The computer readable medium includes all kinds of recording devices in which data that can be read by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, And may also be implemented in the form of a carrier wave (e.g., transmission over the Internet). In addition, the computer may include a controller 180 of the terminal. Accordingly the above detailed description is to be considered in all respects as illustrative and not restrictive. The scope of the present invention should be determined by rational interpretation of the appended claims, and all changes within the scope of equivalents of the present invention are included in the scope of the present invention.

The invention claimed is:

1. A mobile terminal comprising:
   a foldable case including a front case and rear case and configured to be in one of an opened flat state in which a protrusion of the rear case is slid inward into a sliding area of the front case, a folded state in which the protrusion of the rear case is slid outward from the sliding area, and an intermediate state between the opened flat state and the folded state;
   a flexible display on a surface of the foldable case; and
   electrical components between the front case and the rear case,
   wherein the rear case includes a corrugated middle portion configured to flex when the mobile terminal is changed from the opened flat state to the folded state or from the folded state to the opened flat state,
   wherein the corrugated middle portion disposed on a side of the rear case is exposed to the outside,
   wherein the corrugated middle portion includes a first corrugation area located in a center of the corrugated middle portion, a second corrugation area located on a first side of the first corrugation area, and a third corrugation area located on a second side of the first corrugation area,
   wherein a width of the first corrugation area is greater than a width of one corrugation of the second corrugation area or one corrugation of the third corrugation area to provide a space for a coupling hole formed on the first corrugation area, and
   wherein the front case includes a protruded area located on a center of the front case, the protruded area corresponding to the coupling hole formed on the first corrugation area.

2. The mobile terminal of claim 1, wherein the protrusion of the rear case moves in the sliding area so as to correspond to a difference in length between the front case and the rear case.

3. The mobile terminal of claim 1, wherein the corrugated middle portion includes a plurality of slits formed on a lateral side of the rear case.

4. The mobile terminal of claim 1, wherein a thickness of the corrugated middle portion varies from a first thickness to a second thickness periodically.

5. The mobile terminal of claim 1, wherein non-flexible electronic components are disposed on the rear case as positions outside of the corrugated middle portion.

6. The mobile terminal of claim 1, wherein the corrugated middle portion of the rear case includes a plurality of slits and ribs alternating with each other.

7. The mobile terminal of claim 6, wherein a thickness of a corresponding rib is greater than a thickness of a corresponding slit in the corrugated middle portion, and
   wherein the corrugated middle portion comprises an external side surface of the mobile terminal.

8. The mobile terminal of claim 1, wherein the sliding area of the front case has a first depth, and
   wherein the protrusion of the rear case is inserted into the sliding area as much as the first depth when the foldable case is in the opened flat state.

9. The mobile terminal of claim 8, wherein the protrusion of the rear case is inserted into the sliding area to a second depth smaller than the first depth when the foldable case is in the intermediate state.

10. The mobile terminal of claim 9, wherein the protrusion of the rear case is inserted into the sliding area to a third depth smaller than the second depth when the foldable case is in the folded state.

11. The mobile terminal of claim 1, wherein the foldable case further includes:
    a first region including a central portion of the foldable case, the first region being bendable;
    a second region positioned between the first region and an end of the mobile terminal; and
    a third region positioned between the first region and another end of the mobile terminal.

12. The mobile terminal of claim 11, wherein the second and third regions are flat.

13. The mobile terminal of claim 11, further comprising:
    inflexible components including a battery and a PCB positioned in at least one of the second and third regions.

14. The mobile terminal of claim 1, wherein the flexible display includes a plurality of layers, at least one of the plurality of layers includes a silicon (Si) material.

15. The mobile terminal of claim 1, wherein the rear case includes:
    a first band disposed on the rear case in a longitudinal direction; and
    a second band disposed on the rear case in the longitudinal direction, a portion of the second band being overlapped with the first band, wherein the first band includes a plurality of convexities, wherein the second band includes a plurality of concavities facing the plurality of convexities of the first band, and wherein at least a portion of the plurality of the convexities is fitted in the plurality of concavities.

16. The mobile terminal of claim 1, further comprising:

a wire connecting an end of the case to another end of the case; and a winding gadget connected to the wire and configured to apply tension to the wire.

17. The mobile terminal of claim 1, further comprising:

a controller configured to control the flexible display based on a change in the state of the case.

18. The mobile terminal of claim 17, wherein the controller controls the flexible display based on at least one of a speed of the change in the state of the foldable case, an amount of the change in the state of the foldable case, and a direction of the change in the state of the foldable case.

19. The mobile terminal of claim 17, wherein the controller controls the flexible display to display contents on a full screen when the state of the foldable case changes from the folded state to the opened flat state.

\* \* \* \* \*